(12) United States Patent
Khanna

(10) Patent No.: US 11,921,820 B2
(45) Date of Patent: Mar. 5, 2024

(54) REAL-TIME MINIMAL VECTOR LABELING SCHEME FOR SUPERVISED MACHINE LEARNING

(71) Applicant: Fortinet, Inc., Sunnyvale, CA (US)

(72) Inventor: Sameer T. Khanna, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 846 days.

(21) Appl. No.: 17/018,885

(22) Filed: Sep. 11, 2020

(65) Prior Publication Data

US 2022/0083815 A1   Mar. 17, 2022

(51) Int. Cl.
*G06F 18/214* (2023.01)
*G06F 18/10* (2023.01)
*G06F 18/2113* (2023.01)
*G06F 18/2115* (2023.01)
*G06F 18/213* (2023.01)
*G06F 18/22* (2023.01)
(Continued)

(52) U.S. Cl.
CPC .......... *G06F 18/2155* (2023.01); *G06F 18/10* (2023.01); *G06F 18/2113* (2023.01); *G06F 18/2115* (2023.01); *G06F 18/213* (2023.01); *G06F 18/22* (2023.01); *G06F 18/23* (2023.01); *G06F 18/2321* (2023.01);
(Continued)

(58) Field of Classification Search
CPC .. G06F 18/10; G06F 18/2155; G06F 18/2113; G06F 18/2115; G06F 18/213; G06F 18/22; G06F 18/23; G06F 18/2321; G06F 18/24137; G06F 18/2431; G06F 18/28; G06N 5/01; G06N 20/00; G06N 20/10; G06N 20/20; G06N 3/08; G06N 3/09; G06N 3/092
See application file for complete search history.

(56) References Cited

U.S. PATENT DOCUMENTS

2017/0083608 A1* 3/2017 Ye ............................ G06N 20/10
2018/0165554 A1* 6/2018 Zhang ..................... G06F 18/2411
(Continued)

OTHER PUBLICATIONS

Bai, Lei et al., "Automatic Device Classification from Network Traffic Streams of Internet of Things", Dec. 24, 2018, 9 pages.
(Continued)

*Primary Examiner* — Shane D Woolwine
(74) *Attorney, Agent, or Firm* — Jaffery Watson Mendonsa & Hamilton LLP

(57) ABSTRACT

Systems and methods are described for training a machine learning model using intelligently selected multiclass vectors. According to an embodiment, a set of un-labeled feature vectors are received. The set of feature vectors are grouped into clusters within a vector space having fewer dimensions than the first set of feature vectors by applying a homomorphic dimensionality reduction algorithm to the set of feature vectors and performing centroid-based clustering. An optimal set of clusters among the clusters is identified by performing a convex optimization process on the clusters. Vector labeling is minimized by selecting ground truth representative vectors including a representative vector from each cluster of the optimal set of clusters. A set of labeled feature vectors is created based on labels received from an oracle for each of the representative vectors. A machine-learning model is trained for multiclass classification based on the set of labeled feature vectors.

18 Claims, 17 Drawing Sheets

(51) Int. Cl.
  *G06F 18/23*  (2023.01)
  *G06F 18/2321*  (2023.01)
  *G06F 18/2413*  (2023.01)
  *G06F 18/2431*  (2023.01)
  *G06F 18/28*  (2023.01)
  *G06N 3/09*  (2023.01)
  *G06N 3/092*  (2023.01)
  *G06N 5/01*  (2023.01)
  *G06N 20/00*  (2019.01)

(52) U.S. Cl.
  CPC .... *G06F 18/24137* (2023.01); *G06F 18/2431* (2023.01); *G06F 18/28* (2023.01); *G06N 3/09* (2023.01); *G06N 5/01* (2023.01); *G06N 20/00* (2019.01); *G06N 3/092* (2023.01)

(56) References Cited

U.S. PATENT DOCUMENTS

2020/0090009 A1*  3/2020  Arora ..................... G06F 18/23
2021/0216832 A1*  7/2021  Youn ................ G06F 18/24147

OTHER PUBLICATIONS

Settles, Burr, "From Theories to Queries: Active Learning in Practice", JMLR: Workshop and Conference Proceedings 16 (2011) 1-18 Workshop on Active Learning and Experimental Design, 2011, 18 pages.

Nabi, Javaid, "Machine Learning—Multiclass Classification with Imbalanced Dataset", https://towardsdatascience.com/machine-learning-multiclass-classification-with-imbalanced-data-set-29f6a177c1a, Dec. 22, 2018, 15 pages.

"Model Training", Elite Data Science, https://elitedatascience.com/model-training, 10 pages, Copyright 2016-2020.

Seif, George, "The 5 Clustering Algorithms Data Scientists Need to Know", https://towardsdatascience.com/the-5-clustering-algorithms-data-scientists-need-to-know-a36d136ef68, Feb. 5, 2018, 14 pages.

Tang, Yu-Chao et al., "A general framework for solving convex optimization problems involving the sum of three convex function", Apr. 27, 2019, 37 pages.

* cited by examiner

REAL-TIME MINIMAL VECTOR LABELING SCHEME FOR SUPERVISED MACHINE LEARNING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to machine-learning model training. In particular, embodiments of the present invention relate to an approach for efficiently training a machine-learning model for multiclass classification with a small set of training data.

Description of the Related Art

Machine learning is a form of artificial intelligence that enables a system to learn from data and make decisions or predictions without being explicitly programmed. Machine learning models are used in numerous applications. For example, machine learning models are used for email filtering, detection of network intruders, optical character recognition (OCR), customer awareness, recommendation, voice processing, etc. Machine learning approaches are traditionally divided into supervised learning, unsupervised learning, semi-supervised learning, and reinforcement learning.

Supervised learning models are typically highly accurate when trained with correctly labeled data composed of vectors with a good feature set. However, to utilize a supervised learning model, a larger volume of the labeled data set is required. Manually labeling the large amounts of data typically needed for model training is tedious and time-consuming. The problem is exacerbated when it comes to multiclass classification. Multiclass classification requires more data and more keen attention to dataset labeling. Also, multiclass classification is often the victim of class imbalance, where data of one class is more easily obtainable than data of other classes, and hence classes are not represented equally. Failure to account for the class imbalance often causes inaccurate and decreased predictive performance of many classification algorithms.

SUMMARY

Systems and methods are described for training a machine learning model using intelligently selected multiclass vectors. According to an embodiment, a processing resource of a computing system receives a first set of un-labeled feature vectors. The first set of feature vectors are grouped into clusters within a vector space having fewer dimensions than the first set of feature vectors by applying a homomorphic dimensionality reduction algorithm to the first set of feature vectors and performing centroid-based clustering. An optimal set of clusters among the clusters is identified by performing a convex optimization process on the clusters. Vector labeling is minimized by selecting multiple ground truth representative vectors including a representative vector from each cluster of the optimal set of clusters. A set of labeled feature vectors is created based on labels received from an oracle for each of the representative vectors. A machine-learning model is trained for multiclass classification based on the set of labeled feature vectors.

Other features of embodiments of the present disclosure will be apparent from accompanying drawings and detailed description that follows.

BRIEF DESCRIPTION OF THE DRAWINGS

In the figures, similar components and features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Figure 1:
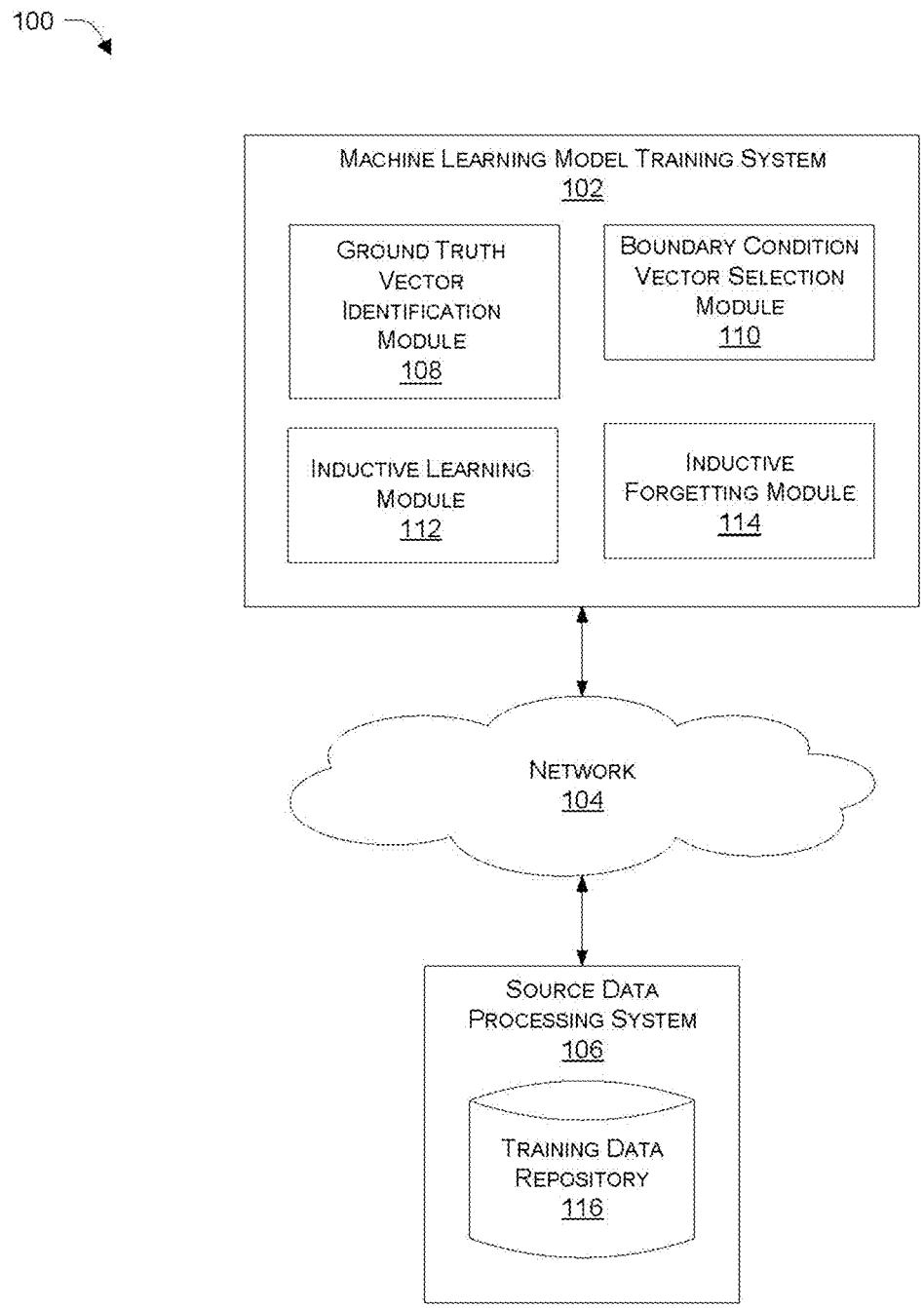
FIG. 1 is a high-level block diagram of a machine-learning model training system in accordance with an embodiment of the present disclosure.

Systems and methods for training a machine learning model using intelligently selected multiclass vectors are described. In the following description, numerous specific details are outlined to provide a thorough understanding of example embodiments. It will be apparent, however, to one skilled in the art that embodiments described herein may be practiced without some of these specific details.

In accordance with various embodiments described herein, starting ground truth vectors are initially identified from a set of unlabeled feature vectors through a novel seed identification algorithm. After the seeds have been labeled, model fitting may be performed to generalize the machine-learning model for similar data to that on which the machine-learning model was trained. Inductive learning and inductive forgetting may then be performed to inductively learn new vectors and inductively forget bad ones, respectively. As described further below, new vectors may be intelligently selected for labeling and after labeling the machine-learning model may be fit and inductive learning and inductive forgetting may again be performed. The identification of new vectors for labeling, model fitting, and inductive learning and inductive forgetting may be repeated until an oracle is satisfied with the results produced by the model.

According to one embodiment, a system first receives a set of feature vectors, extracts and identifies seed vectors that represent the ground truth of the specified vector space created from the first set of feature vectors for labeling, and receives a label for each of the feature vectors via oracle identification. The system may then train a machine learning model using the labeled feature vectors, identify other vectors for oracle identification, and perform inductive learning and inductive forgetting.

According to an embodiment, the vectors that represent the ground truth may be identified by applying a homomorphic translation to the first set of feature vectors, for example, using T-Distributed Stochastic Neighbor Embedding (t-SNE) to obtain a second set of feature vectors with reduced dimensionality, clustering the second set of feature vectors to get an initial set of clusters using automated centroid based clustering, obtaining an optimal set of clusters by applying convex optimization on the initial set of clusters, and selecting one or more representative vectors from each cluster of the optimal set of clusters for labeling. In this manner, the tedious and time-consuming process of labeling of a large dataset can be avoided and the system can immediately start utilizing the machine learning model in real-time beginning with an unlabeled dataset.

In one embodiment, when training models with relatively low numbers of vectors, Gaussian noise may be introduced in order to improve model generalizability. For example, suppose different animals are being classified into groups. If all labeled canines have spots, while all other labeled classes do not, this may create classification issues. Consider, for example, if an attempt is made to classify a rabbit that happens to have spots, the model is likely to classify the rabbit as a canine due to the presence of spots. At the same time, the given space may be synthetically oversampled to overcome potential class imbalance. In this manner, when a certain class type occurs extremely infrequently, the model can achieve improved performance by simply ignoring this classification entirely. Harkening back to the animal classifier, this would be equivalent to simply ignoring the existence of endangered species. The entire process may continue recursively until the machine learning model performance is found to be satisfactory by the oracle.

In an embodiment, the system may obtain the initial set of clusters using a constructed probability distribution of the Cartesian distance between the unlabeled feature vectors and selects the one or more representative vectors based on the distance of feature vectors from the center of a respective cluster of the optimal set of clusters.

To further improve the performance of the machine learning module, in some embodiments, the system may detect one or more boundary condition vectors for further labeling. The one or more boundary condition vectors may be selected by calculating a prediction skepticism score of each feature vectors of the first set of feature vectors that remain unlabeled when classified using the machine learning model, and reverse sorting the first set of feature vectors based on their respective prediction skepticism score. The system may then select the one or more boundary condition vectors for labeling based on those having the highest degree of skepticism. For example, the selected boundary vectors may be presented to the oracle for labeling and the provided label may be associated label with the selected boundary condition vectors.

To further improve the performance of the machine learning model, in some embodiments, the system may perform inductive learning. Inductive learning may be performed by selecting an un-labeled feature vector from the first set of feature vectors, classifying the un-labeled feature vector using the machine learning model to get a model classified cluster with a confidence score, determining whether the confidence score is greater than a threshold, determining a distance of the un-labeled feature vector with respect to each labeled feature vector of the first set of feature vectors, when the confidence score is greater than the threshold, determining a statistically significant matching cluster of labeled feature vectors to which the un-labeled feature vector is closest based on the determined distance, determining whether the model classified cluster and the statistically matching cluster are the same, labeling the un-labeled feature vector based on the label associated with the model classified cluster when the model classified cluster and the statistically matching cluster are identical, and training the machine learning model based on the labeling. When the results are not the same, the vector may be marked for oracle determination. In one embodiment, the measure of distance among feature vectors in multivariate space is represented by the Mahalanobis distance. Those skilled in the art will appreciate various other distance metrics may be used, including, but not limited to Wasserstein distance, Bhattacharyya distance, Kolmogorov-Smirnov statistic, Energy distance, Lubaszyk-Karmowski metric and f-divergences, such as Kullback-Leibler divergence.

In some embodiments, inductive forgetting may involve selecting a feature vector from a set of feature vectors that have been labeled through inductive learning, classifying the feature vector using the machine learning model to get a model classified cluster with a confidence score, determining whether the confidence score is lower than a base threshold, when the confidence score is below the base threshold, un-labelling the feature vector when the model skepticism is higher than the base threshold, and training the machine learning model based on the un-labeling.

In one embodiment, the inductive learning is slow and deterministic when learning new vectors, while the inductive forgetting is hyper aggressive when it comes to forgetting old ones. As those skilled in the art will appreciate, this combination ensures few mistakes are made when learning, and any mistakes that are made are quickly rectified.

As those skilled in the art will appreciate a machine-learning model training system as described herein may be used in a variety of contexts. In one non-limiting example, the machine-learning model training system may train the machine-learning model for classifying Internet of Things (IoT) devices in which the first set of feature vectors may be representative of multiple types of IoT devices (e.g., security cameras, smart printers, and/or smartphones). The trained machine-learning model may then be deployed within a network access control (NAC) device, for example, to enforce policies on IoT devices that attempt to connect to a network protected by the NAC.

Embodiments of the present invention include various steps, which will be described below. The steps may be performed by hardware components or may be embodied in machine-executable instructions, which may be used to cause a processing resource (e.g., a general-purpose or special-purpose processor) programmed with the instructions to perform the steps. Alternatively, steps may be performed by a combination of hardware, software, firmware, and/or by human operators.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides the one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection, and mitigation, sandbox analysis, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), sandbox appliances (e.g., the FORTISANDBOX family of sandbox appliances or the FORTISANDBOX CLOUD cloud-based managed sandbox service), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

As used herein, a "network resource" generally refers to various forms of data, information, services, applications, and/or hardware devices that may be accessed via a network (e.g., the Internet). Non-limiting examples of network resources include web applications, cloud-based services, network devices, and/or associated applications (e.g., user interface applications), and network security devices and/or associated applications (e.g., user interface applications).

FIG. 1 is a high-level block diagram 100 of a machine-learning model training system 102 in accordance with an embodiment of the present disclosure. In on embodiment, the machine learning model training system 102 is operable to train a machine-learning model using a supervised learning method with intelligently selected feature vectors. The machine learning model training system 102 can train machine learning models for a variety of purposes. For example, the system 102 can train a Machine Learning (ML) model for classifying a network packet, an ML model for classifying devices into different categories, an ML model for email filtering, an ML model for detection of network intruders, an ML model for optical character recognition (OCR), an ML model for customer awareness, an ML model for content recommendation, and an ML model for voice processing.

At least one advantage of various embodiments described herein approach described herein includes the ability of the system 102 to train a machine learning model (not shown) without requiring labeling of a large dataset. In some embodiments, the system 102 can immediately start utilizing the machine learning model in real-time beginning with an unlabeled dataset. In the context of the present example, the system 102 includes a ground truth vector identification module 108, a boundary condition vector selection module 110, an inductive learning module 112, and an inductive forgetting module 114. The ground truth vector identification module 108 may be responsible for identifying feature vectors for labeling and for training of a machine-learning model. The boundary condition vector selection module 110 may be responsible for selection of boundary condition feature vectors, for example, representing feature vectors having a high degree of prediction skepticism, for labeling. The inductive learning module 112 may be responsible for training the machine learning model with inductive learning. The inductive forgetting module 114 may be responsible for updating the machine learning model by un-labeling a feature vector previously labeled through inductive learning. Typically, supervised learning algorithms require large amounts of data, with requirements easily reaching the tens of thousands of samples. In embodiments described herein, the system 102 reduces the effort of labeling large swaths of data samples by orders of magnitude.

In an embodiment, the machine learning model training system 102 may receive training data samples from a training data repository 116 hosted, for example, by a source data processing system 106 through network 104. The training data repository 116 may store unlabeled data samples of different types and may share unlabeled data samples based on a request from the machine learning model training system 102. Based on the purpose for which the machine learning model is being trained, the system 102 may request data of certain types, for example, network traffic data, from the training data repository 116.

The ground truth vector identification module 108 receives unlabeled feature vectors derived from unclassified data samples and identifies a set of ground-truth representative vectors for oracle identification. In one embodiment, these vectors symbolize the most representative examples for each of their classes, for example a perfectly drawn number four in a Modified National Institute of Standards and Technology (MNIST) dataset or a stereotypical dog in an animal classification dataset. The ground truth representative vectors after oracle identification are used to train the machine learning model.

The ground truth vector identification module 108 may receive a set of feature vectors that are un-labeled, group the first set of feature vectors into multiple clusters within a homomorphically transformed vector space derived from the first set of feature vectors, identify an optimal number of clusters among multiple clusters by performing a convex optimization process on the identified clusters, and select multiple ground truth representative vectors including a representative vector from each cluster of the optimal number of clusters for vector labeling. The representative vectors may be selected based on a distance from a center of their respective centroids of the optimal set of clusters. In an embodiment, the dimensionality of the first set of feature vectors is reduced by applying a homomorphic transformation to the first set of feature vectors and performing centroid-based clustering. A non-limiting example of the homomorphic transformation is the T-Distributed Stochastic Neighbor Embedding (t-SNE) algorithm. Module 108 may perform the centroid-based clustering based on constructed probability distributions of Cartesian distances between different vectors within the homomorphic-translated set. For example, in the context of performing animal classification, an animal with 4 legs has a higher probability of being a dog than being a bird, and thus will be closer in Cartesian space to the dog centroid than the bird centroid.

Ground truth vector identification is a significant aspect of machine learning as the performance of any machine learning model depends largely on how the model was trained and what data samples were used for training. The ground truth vector identification module 108 identifies ground truth representative vectors for labeling through oracle identification, for example, in which a user, automated process, or other means (e.g., a database lookup) can tag ground truth representative vectors or use other means for tagging. As one may appreciate, the system 102 uses a set of ground truth representative feature vectors for training the ML model, instead of a large volume of data samples generally required for any supervised machine learning training. The system 102 creates a set of labeled feature vectors based on labels received from the oracle identification for each of the plurality of representative vectors and trains a machine-learning model for multiclass classification based on the set of labeled feature vectors. In addition to typical multiclass classification, such ground truth representative vectors can be directly useful as well for a variety of other potential issues, such as embedding, where symbolic representations like categorical items and words may be translated into numbers that can capture underlying semantic relations. This is exceptionally useful in the field of Natural Language Processing.

In an embodiment, the boundary condition vector selection module 110 calculates a prediction skepticism score for each feature vector of the first set of feature vectors when classified using the machine learning model, reverse sorts the first set of feature vectors based on their respective prediction skepticism scores, and selects an optimal boundary condition vector having the highest degree of prediction skepticism (e.g., the vector at the top of the reverse sorted list) for labeling. A prediction skepticism heuristic function may be used to calculate the prediction skepticism scores. In an embodiment, the boundary condition vector with the highest prediction skepticism is selected for further labeling by oracle identification. For example, in the context of an MNIST dataset, a handwritten four that could be mistaken as a nine would be an ideal boundary decision vector to mark for oracle identification. The system 102 associates a label received from the oracle identification with the selected boundary condition vector and retrains the machine-learning model. Repeating this process inductively allows the machine-learning model to better understand the high dimensional hyperplanes that separate vectors of different classes from one another, all without needing to calculate these boundaries by hand.

The inductive learning module 112 may further train the machine learning model with inductive learning. According to one embodiment, the module 112 may select an unlabeled feature vector from the first set of feature vectors, classify the un-labeled feature vector using the machine learning model to get a model classified cluster with a confidence score, determine a statistically matching cluster of labeled feature vectors to which the un-labeled feature vector is closest based on a distance metric (e.g., the Mahalanobis distance), determine whether the model classified cluster and the statistically matching cluster are considered to be the same, label the un-labeled feature vector based on the label associated with the model classified cluster when the model classified cluster and statistically matching cluster are the same. As those skilled in the art will appreciate, the smaller the distance metric is between two feature vectors, the more statistically likely the points belong to the same class. For example, assuming different fruits are being classified and bananas have already been labeled, then other vectors that are indicative of an elongated, curved yellow fruit with thick skin and soft sweet flesh that grow in bunches could safely also be labeled as bananas too by the aforementioned algorithm. In this manner, the performance of the machine learning model may be improved as a result of the system 102 using both model confidence and statistical significance for inductive learning.

The inductive forgetting module 114 may be used to update the machine learning model with inductive forgetting. In one embodiment, the module 114 selects a feature vector from a set of feature vectors that have been labeled through the inductive learning and classifies the selected feature vector using the machine learning model to obtain a model classified cluster with a confidence score. The inductive forgetting module 114 may then un-label the feature vector when the model confidence is lower than the base threshold. In this manner, the system 102 may opportunistically perform inductive forgetting to mitigate the effect of early mistake reinforcement. Turning back to the fruit classification example, if a strawberry vector was previously mistakenly learned as an apple, those skilled in the art will appreciate it is desirable to forget this incorrect label as early as possible to reduce negative consequences of such an error.

In an embodiment, the system 102 may store feature vectors labeled through oracle identification or through an inductive learning process in the training data repository 116. The labeled feature vectors can be used by a supervised machine learning system to train a machine learning model without investing a large amount of resources and without undue delay caused in data labeling. Depending on the purpose for which it was trained, the machine learning model can be deployed to predict or classify newly observed data samples. For example, the trained machine learning model may be made available within a network security device, such as a NAC appliance, to facilitate classification of IoT devices and enforcement of policies on IoT devices attempting to access a private network protected by the NAC appliance.

Various advantages of the system 102 over existing machine learning training systems include the ability to use significantly fewer data samples for training a machine learning model. Additionally, the trained model is expected to perform better in terms of its prediction accuracy. Existing machine learning training systems typically require hundreds to thousands of sample data points in order to achieve acceptable prediction results, which is simply not acceptable in many environments. For example, if a prior approach were used to classify IoT devices, in small to medium-sized enterprises the training phase could easily require feature vectors for all IoT devices in the company. Due to the intelligent ground truth vector identification and boundary conditional feature vector selection employed by various embodiments, efficiency, and performance of the machine learning model improve significantly. Research has shown that existing machine learning approaches typically perform no better than random subset learning in real world vector spaces. Empirical data suggest that embodiments of system 102, on the other hand, are far more effective in real-world tasks (e.g., classification of IoT devices). For example, the machine learning model training system 102 may perform ground truth vector identification and vector selection in real-time while training the model and does necessarily have to maintain a generalized dataset. This has many potential benefits, for example, not all corporate environments are the same, with some having smart televisions or smart cameras, while others may have smart wearables instead. When it comes to multiclass classification, the more general a model needs to be, the more its performance tends to suffer as a result. By reducing labeling to a manageable degree in a manner that can be handled by a novice in the field, the necessity for a general model is removed. The machine learning model training system 102 provides flexibility to train a machine learning model on actual data collected from the environment in which the model is going to be deployed. In this manner, the system 102 trains the machine learning model for specific problem space, thereby providing better accuracy and robust prediction as compared to a generic machine learning model.

The system 102 may support different model types, from simple "sklearn" models to a complex neural network. Unlike active learning systems that require specific models, typically limited to Support Vector Machines or K-Nearest Neighbors, and require complex hyperparameter tuning that must be done on an individualized basis, the system 102 may support different models without the need for tuning by an expert in the field. In one embodiment, the system 102 provides the flexibility of choosing a model; the algorithm used is not specific to a particular model, and thus the user has full control over which problems to tackle as well as the approach employed. The system 102 does not require selection of generalized datasets beforehand as it picks the best feature vector to label on the go. An example of the system 102 is described in further detail below with reference to FIG. 2.

Figure 2:
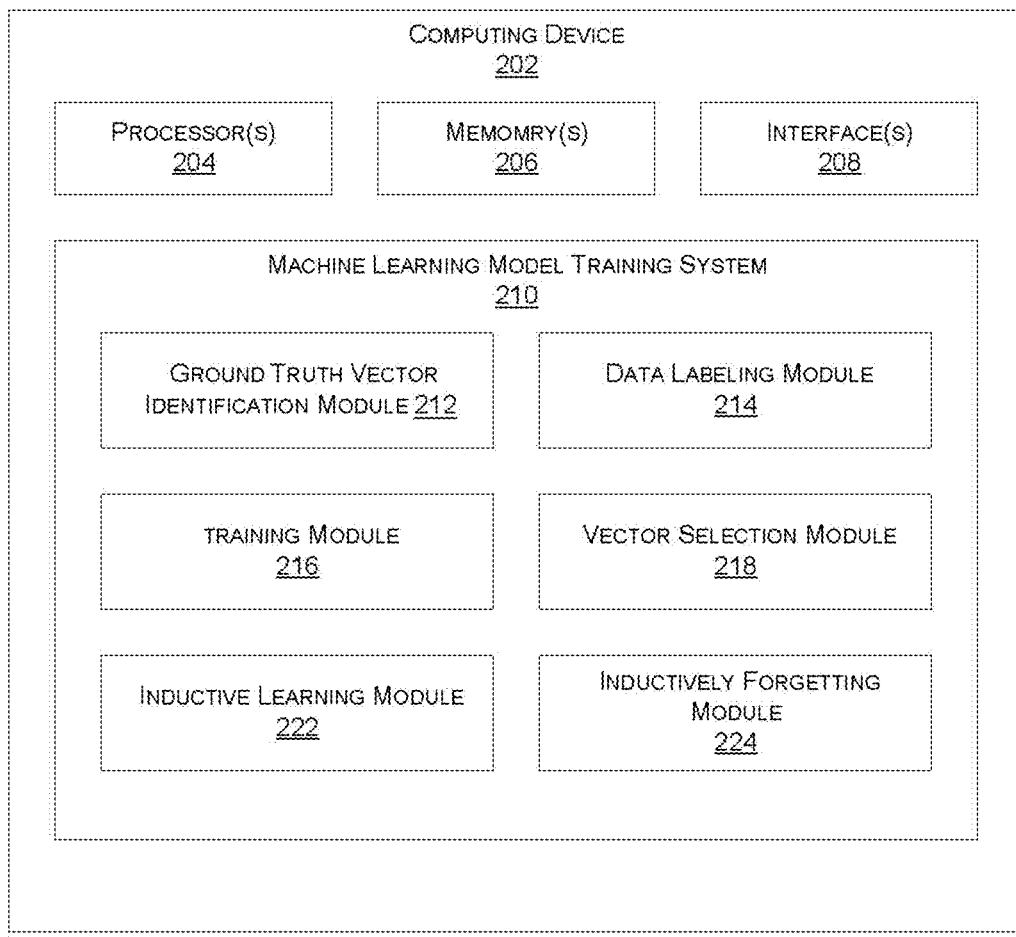
FIG. 2 illustrates the functional modules of a machine-learning model training system in accordance with an embodiment of the present disclosure.

FIG. 2 illustrates the functional modules of a machine-learning model training system 210 in accordance with an embodiment of the present disclosure. A computing device 202 having one or more processing resources (e.g., processors 204) is configured to execute programmable instructions associated with functional modules stored in memory 206. The computing device 202 may have different input-output interfaces 208, including network interfaces for receiving data from and sending data to other network devices. The interfaces 208 may include an Ethernet interface, a wireless interface, and other communication interfaces. The one or more processors 204 of the computing device 202 executes the instructions associated with the execution of functional modules of the machine learning model training system 210. In one embodiment, the machine learning model training system 210 achieves good model performance while minimizing the number of data samples that are to be labeled.

In the context of the present example, the machine learning model training system 210 (which represents a non-limiting example of the machine learning model training system 102) includes a ground truth vector identification module 212 configured to identify ground truth representative vectors, for labeling by oracle identification. Oracle identification allows the ground truth representative vectors to be labeled by one or more users or by other means, such as an automated process and/or a database lookup. The ground truth vector identification module 212 is configured to receive a set of feature vectors that are un-labeled through a suitable interface. The ground truth vector identification module 212 reduces dimensions of the first set of feature vectors by applying a homomorphic dimensionality reduction algorithm (e.g., t-SNE) to the first set of feature vectors and groups the first set of feature vectors into multiple clusters within a vector space having fewer dimensions than the first set of feature vectors by, for example, performing centroid-based clustering. In one embodiment, the ground truth vector identification module 212 identifies a representation of vector space based on both linear and nonlinear tendencies of the first set of feature vectors via a combination of t-SNE and centroid based clustering to obtain a set of favorable clusters based on initial seeding and centroid numbers. By using a homomorphic dimensionality reduction algorithm, the ground truth vector identification module 212 improves the runtime performance of cluster analysis by causing a dramatic reduction to the number of dimensions that need to be handled. As those skilled in the art will appreciate, the more dimensions a dataset has, the less precise the concept of dimensions becomes. Since the distance between any two points in a given vector space converges, the discrimination of the near and far points becomes less meaningful and thus extreme dimensionality reduction may be performed to effectively cluster high dimensional feature sets. This also facilitates the use of linear-based clustering techniques (e.g., k-means) while still capturing nonlinear relationships between points. Usage of the homomorphic dimensionality reduction algorithm, for example, t-SNE, allows data clustering based upon both linear and nonlinear tendencies, resulting in more accurate to reality clusters.

According to one embodiment, the ground truth vector identification module 212 identifies an optimal set of clusters from the multiple clusters by applying a convex optimization process on the multiple clusters. In an embodiment, the ground truth vector identification module 212 may use the following convex optimization function (which may be referred to as Function-1 hereafter) to obtain an optimal number of clusters:

Function-1
$$\text{argmax}_C \left( \text{mean}_i \left( \frac{\min_{k \neq 1}\left(\frac{1}{|C_k|}\right)\sum_{j \subset C_k} \|i-j\| - \frac{1}{|C_i|-1}\sum_{j \subset C_i, i \neq j} \|i-j\|}{\max\left(\frac{1}{|C_i|-1}\sum_{j \subset C_i, i \neq j} \|i-j\|, \min_{k \neq 1}\left(\frac{1}{|C_k|}\right)\sum_{j \subset C_k} \|i-j\|\right)} \right) \right)$$

Function-1 allows the ground truth vector identification module 212 to evaluate different clusters based upon how well-encapsulated data is within the optimal cluster location for the given number of clusters by evaluating both the smallest distance between a point and a cluster as well as the average distance between a point and other vectors in the space, where distance can be measured by a variety of algorithms, including the L1 norm. Clusters to be evaluated can also be generated via a variety of different methods, such as single linkage clustering, complete linkage clustering, and average linkage clustering. As those skilled in the art will appreciate, the ground truth vector identification module 212 removes the requirement of an expert to manually identify optimal clustering and instead facilitates a programmatic approach in which optimal clusters may be identified by convex optimization software packages (e.g., CVXOPT).

The ground truth vector identification module 212 may select a set of ground truth representative vectors, including a representative vector from each cluster of the optimal set of clusters. In one embodiment, the representative vectors of a cluster are the feature vectors selected based on a distance from the center of the respective cluster. For example, features vectors closer to the center are selected.

The system 210 includes a data labeling module 214 configured to take the ground truth representative vectors, label each feature vector of the group of true representative vectors through oracle identification, and create a set of labeled feature vectors. In an embodiment, the data labeling module 214 may present or send feature vectors for labeling to one or more users. The data labeling module 214 allows the one or more users to label the feature vectors manually or allow the labeling of feature vectors through other sources.

The system 210 includes a training module 216 configured to train a machine learning model using the set of labeled feature vectors. The machine learning model may be further optimized by performing model fitting. For example, to improve generalization, the training module 216 may add normally distributed noise to the data. The training module 216 may further perform synthetic minority over-sampling to reduce the effects of class imbalance. After identification of ground truth vectors, training the model with the given vectors, and model fitting, the system 210 may further select one or more boundary condition feature vectors for labeling through oracle identification.

The system 210 includes a boundary condition vector selection module 218 configured to select a boundary condition feature vector for labeling through oracle identification. In an embodiment, the boundary condition vector selection module 218 calculates a prediction skepticism using a skepticism heuristic function for each feature vector of the set of feature vectors that are unlabeled when classified using the machine-learning model and selects a boundary condition vector for labeling from the set of feature vectors that are un-labeled. According to one embodiment, the boundary condition vector selected for labeling is the boundary condition vector having the highest degree of skepticism. In an embodiment, the boundary condition vector selection module 218 calculates prediction uncertainty heuristics for each feature vector of the first set of feature vectors when classified using the machine learning model, reverse sorts the first set of feature vectors based on their respective prediction skepticism score and select a boundary condition vector for labeling from top of the reverse sorted list of the set of feature vector according to their respective prediction skepticism scores.

In one embodiment, the boundary condition vector selection module 218 may use the following custom heuristic function (which may be referred to as Function-2 hereafter) to calculate prediction skepticism:

$$\mathcal{H} = -\sum_i Pr[y_i = y \mid x_i] * \log_c(Pr[y_i = y \mid x_i]) - \quad \text{Function-2}$$
$$\text{argmax}_{i,j}(\|Pr[y_i = y \mid x_i] - Pr[y_i = y \mid x_i]\|) * \frac{\text{\#classes}}{\sum_i Pr[y_i = y \mid x_i]}$$

Function-2 calculates a predictive skepticism metric for a given feature vector. The skepticism heuristic function attempts to maximize Shannon's entropy of the probability distribution. As one may appreciate, more even distributions lead to higher values, while uneven value distributions would lead to lower values. An event with lower probability carries more skepticism than higher probability events. In addition, the heuristic function aims to minimize the maximum probability margin. The higher the margin, the lower the skepticism, so embodiments generally aim to minimize this value. Thus, when combined, a higher value resulting from the above heuristic function indicates a feature vector having a higher degree of skepticism. In one embodiment, the boundary condition feature selection module 218 selects a feature vector having the highest degree of skepticism for labeling. In an embodiment, the boundary condition feature selection module 218 may select multiple boundary condition feature vectors similarly and request labeling of boundary condition feature vectors through oracle identification.

The data labeling module 214 may send the boundary condition feature vector selected by the module 218 for labeling through oracle identification. Based on the label received for the boundary condition feature vector, the system 210 can retrain the machine learning model. For example, the machine learning model may be retrained from scratch or through a process known as batch training.

The system 210 further includes an inductive learning module 222 for inductive learning and an inductive forgetting module 224 for forgetting wrongly classified feature vectors. In an embodiment, the system 210 may use inductive learning module 222 to label unlabeled feature vectors that were not labeled through oracle identification. The inductive learning module 222 labels feature vectors through an inductive process. The inductive learning module 222 intelligently selects an unlabeled feature vector for labeling. Instead of opportunistically labeling feature vectors, also referred to as data points that are likely to be correct, the inductive learning module 222 conservatively selects un-labeled feature vectors. The inductive learning module 222 selects an unlabeled feature vector, classifies the un-labeled feature vector using the machine learning model to obtain a model classified cluster with a confidence score, determines a statistically matching cluster of labeled feature vectors to which the un-labeled feature vector is closest (e.g., based on Mahalanobis distance), determines whether the model classified cluster and the statistically matching cluster are the same, and labels the un-labeled feature vector based on the label associated with the model classified cluster when the model classified cluster and statistically matching cluster are the same.

In an embodiment, the inductive learning module 222 determines a Mahalanobis distance of the un-labeled feature vector with respect to each labeled feature vector of the first set of feature vectors and determines a statistically matching cluster of labeled feature vectors to which the un-labeled feature vector is closest based on the determined Mahalanobis distance. A cluster of labeled feature vectors for which Mahalanobis distance is the smallest is a more statistically likely cluster to which the unlabeled feature vector will belong.

In an embodiment, the inductive learning module 222 receives an unlabeled feature vector, classifies the unlabeled feature vector using the machine learning model, and evaluates confidence metrics. If the machine learning model cannot classify the unlabeled feature vector with a very high confidence score, then the unlabeled feature vector will be discarded. In a case where the confidence score with which the machine learning model is able to classify an unlabeled feature vector is less than a threshold, the inductive learning module 222 further performs statistical analysis to identify a statistically matching cluster. If the machine-classified cluster and the statistically matching cluster have low correlation, then again, the unlabeled feature vector is not learned but rather is sent to the oracle for identification. When the machine-classified cluster and the statistically identified cluster are identical, the unlabeled feature vector is labeled. The system 210 may iteratively perform this inductive learning process until no new data points are suggested for labeling. By learning high confidence vectors one by one iteratively, we can the resolution of decision boundaries can be dramatically improved with little to no oracle intervention.

In an embodiment, where the machine-classified cluster and the statistically matching cluster have low correlation, the inductive learning module 222 determines if the machine learning model is able to classify the unlabeled feature vector with a relatively high confidence score, but the statistical likelihood of the unlabeled feature vector falling under the identified cluster is low. The inductive learning module 222 may request a label through oracle identification if the machine learning model is able to classify the unlabeled feature vector with a relatively high confidence score, but the statistical likelihood of the unlabeled feature vector falling under the identified cluster is low. This is an important vector that can give the model more insight into the vector space as a whole.

To further improve the accuracy of the machine learning model, the system 110 may opportunistically attempt to identify a wrongly classified feature vector using the inductive forgetting module 222 and performs model training if required after un-labeling the wrongly classified feature vector. The inductive forgetting module 114 trains the machine learning model with inductive forgetting. The module 114 selects each feature vector from a set of feature vectors that have been labeled through the inductive learning, classifies the feature vector using the machine learning model to get a model classified cluster with a confidence score, and un-labels the feature vector when the model confidence is lower than the base threshold. In this manner, the system 102 opportunistically performs inductive forgetting to mitigate the potential negative effects of early mistake reinforcement.

In an embodiment, the inductive learning module 222 determines a distance metric (e.g., the Mahalanobis distance) of the un-labeled feature vector with respect to each labeled feature vector of the first set of feature vectors and determines a statistically matching cluster of labeled feature vectors to which the un-labeled feature vector is closest based on the determined distance. A cluster of labeled feature vectors for which the distance is the smallest is statistically likely the cluster to which the unlabeled feature vector will belong.

In an embodiment, the inductive forgetting module 222 picks a labeled feature vector from a set of labeled feature vectors that have been labeled by inductive learning, classifies the labeled feature vector using the machine learning model, and evaluates confidence metrics. If the machine learning model can classify the labeled feature vector with a very high confidence score, then the labeled feature vector will be left labeled as it is. In a case where the confidence score with which the machine learning model is able to classify a labeled feature vector is less than a threshold, the labeled feature vector may be un-labeled.

In an embodiment, the inductive forgetting module 222 identifies a labeled feature vector that may have been wrongly classified. The system 210 tries to identify wrongly labeled data points that may negatively affect the performance of the machine learning model. As those skilled in the art will appreciate, the combination of conservative learning and opportunistic forgetting improves confidence in the prediction by the machine learning model.

Figure 3:
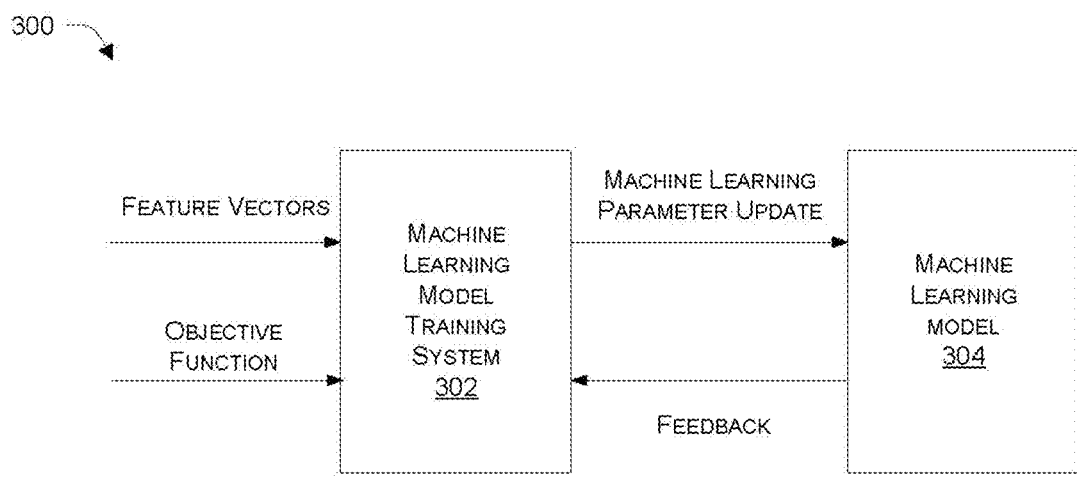
FIG. 3 is a block diagram illustrating training of a machine-learning model by a machine-learning model training system for a given objective function in accordance with an embodiment of the present disclosure.

FIG. 3 is a block diagram 300 illustrating training of a machine-learning model by a machine-learning model training system 302 for a given objective function in accordance with an embodiment of the present disclosure. A machine learning model training system 302 (which represents a non-limiting example of machine learning model training systems 102 and 210) may train a machine learning model 304 for a given objective function. The machine learning model training system 302 may receive an objective function written to achieve one or more defined objectives, and sample feature vectors or raw data points. Unlike other training systems, the system 302 can directly receive unlabeled feature vectors, may select feature vectors for labeling, receive labeling for those selected feature vectors and train the machine learning model 304 for the given objective function. In an embodiment, the system 302 can remotely train a machine learning model 304 deployed in a network environment. The machine learning model training system 302 may receive feedback from the machine learning model or other sources and may retrain the model by sending a machine learning parameter update. For example, the machine learning model may be retrained from scratch or through a process known as batch training. The machine learning model training system 302 may use an appropriate learning algorithm like sklearn, support vector machine (SVM), K-nearest neighbors, and neural networks, depending on the objective function for which the machine learning model 304 is being trained.

Figure 4:
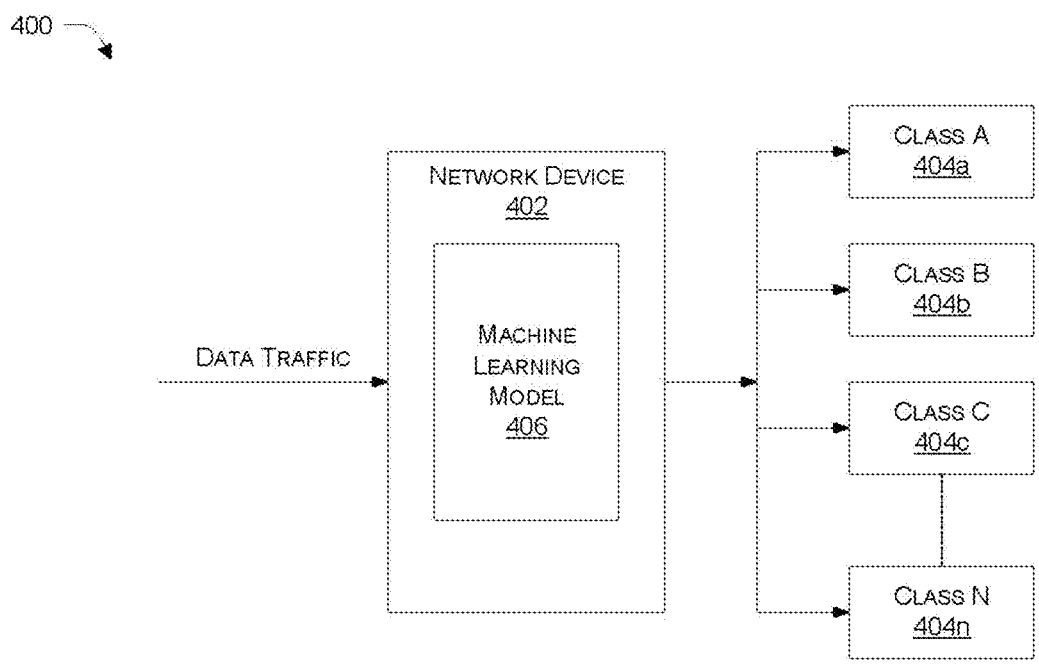
FIG. 4 is a block diagram illustrating data stream processing by a network device using a machine-learning model trained in accordance with an embodiment of the present disclosure.

FIG. 4 is a block diagram 400 illustrating data stream processing by a network device 402 using a machine-learning model trained in accordance with an embodiment of the present disclosure. A machine learning model 406 can be trained by a machine learning model training system (e.g., machine learning model training system 102, 210, or 302) for an objective function relating to classification of network packets or network data traffic. Once trained, the machine learning model 406 can be deployed on a network device 402 (e.g., a network security device, such as a NAC) to receive data traffic and classify the device from which the data traffic was received into different categories.

In an embodiment, the system 302 can train the machine learning model 406 for classifying IoT devices. In this particular usage model, the first set of feature vectors may be representative of multiple types of IoT devices, and the machine learning model 406 may be trained for classifying the IoT devices. The trained machine learning model 406 may be deployed on a network device 402 to receive the data traffic, analyze various attributes of the data traffic and classify the data traffic into traffic originating or destined to different classes of IoT devices. For example, the machine learning model 406 may classify the data traffic in different IoT categories, represented by Class A 404a, Class B 404b, Class C 404c, and Class N 404n.

Figure 5:
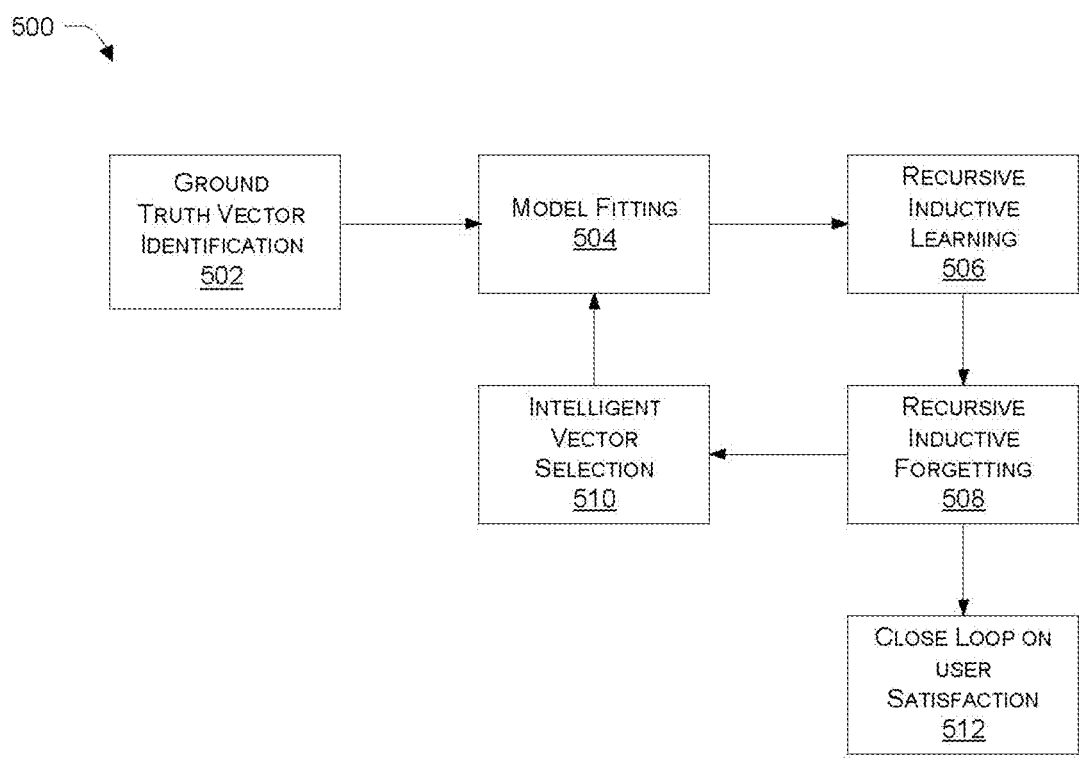
FIG. 5 is a block diagram illustrating iterative training of a machine-learning model in accordance with an embodiment of the present disclosure.

FIG. 5 is a block diagram 500 illustrating iterative training of a machine-learning model in accordance with an embodiment of the present disclosure. As shown in FIG. 5, a machine learning model training system may perform ground truth vector identification as shown at block 502 to select the best representative feature vectors for labeling from a given set of unlabeled feature vectors and may perform model fitting as shown at block 504 to train a machine learning model with the labeled representative feature vectors. The best representative feature vectors may be selected intelligently by a ground truth vector identification module (e.g., ground truth vector identification module 212) further details of which are described below with reference to FIG. 6. The system interactively improves the capability of a machine learning model by identifying boundary condition feature vectors for labeling, inductive learning unlabeled feature vectors, inductively forgetting wrongly labeled feature vectors, and performing model fitting after each iteration. In the context of the present example, the system performs intelligent vector selection 510 to identify boundary condition feature vectors that may be sent for oracle identification. The system performs model fitting 504 based on the labeling of boundary condition feature vectors. In the context of the present example, recursive inductive learning 506 and recursive inductive forgetting 508 may be performed to improve the performance of the trained machined learning model. The training system recursively performs inductive learning 506, inductive forgetting 508, intelligent vector selection 510, and model fitting 504 until the model produces satisfactory results as indicated by an oracle. For example, the training system may close the training loop on user satisfaction, as shown in block 512.

Figure 6:
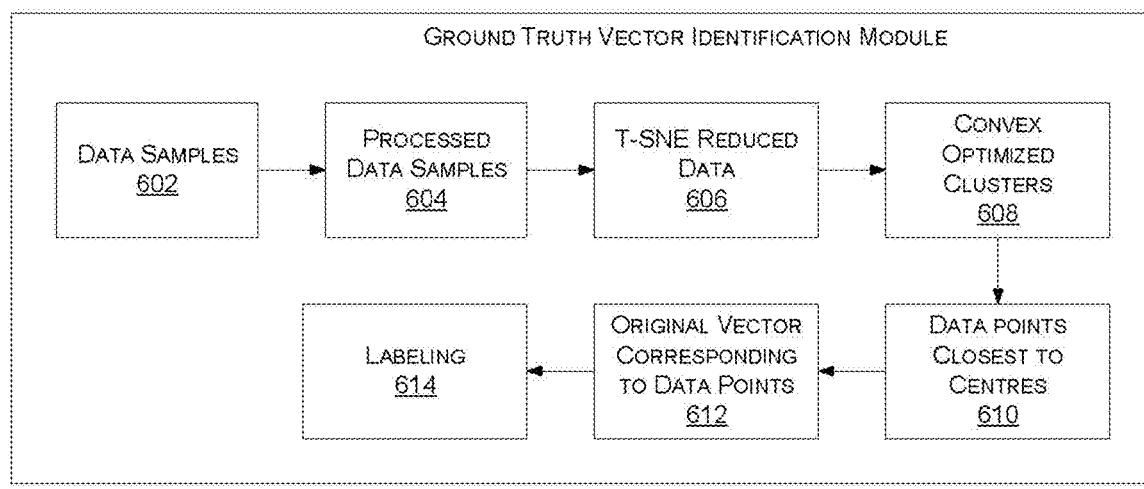
FIG. 6 is a block diagram illustrating a ground truth vector identification process in accordance with an embodiment of the present disclosure.

FIG. 6 is a block diagram illustrating a ground truth vector identification process performed by a ground truth vector identification module 600 in accordance with an embodiment of the present disclosure. A supervised machine-learning model typically requires a large number of labeled data samples for training. Researchers of machine learning have observed that gathering, organizing, and labeling data samples takes approximately 80% of the time of any machine-learning project. The time required in labeling data samples used for training the model is one of the reasons for delayed adaptation of machine learning and Artificial Intelligence (AI) projects.

In the context of the present example, the ground truth vector identification module 600 identifies a set of ground truth representative vectors, for labeling from a set of unlabeled feature vectors. In an embodiment, the ground truth vector identification module 600 seeks to minimize the number of data points that a user needs to label. The ground truth vector identification module 600 analyzes how the processed data points 602 are clustered to identify the best representative data points. The ground truth vector identification module 600 receives initial data sample 602 that are unlabeled and derives processed data samples 604 from the initial data samples 602, for example, after cleaning the data. The ground truth vector identification module 600 creates feature vectors from the cleaned data samples. The ground truth vector identification module 600 receives a first set of feature vectors, which are un-labeled, and homomorphically translates the first set feature vectors, for example, using T-Distributed Stochastic Neighbor Embedding (t-SNE) to obtain a second set of feature vectors with reduced dimensionality, also referred as t-SNE reduced data 606. The ground truth vector identification module 600 may then cluster the second set of feature vectors to obtain an initial set of clusters using centroid-based clustering and obtains an optimal set of clusters by applying convex optimization on the initial set of clusters. The optimal set of clusters derived from the convex optimization may be referred to herein as convex optimized clusters 608. The ground truth vector identification module 600 then selects one or more representative vectors from each cluster of the optimal set of clusters for labeling that are closest to the center of the respective cluster at 610. The ground truth vector identification module 600 sends for labeling the one or more representative vectors 612, which are data points closest to the centers of their respective clusters, to an oracle (e.g., a user, an automated process, or a database lookup) for labeling at 614. In an embodiment, the ground truth vector identification module 600 obtains an initial set of clusters using a constructed probability distribution of the Cartesian distance between the un-labeled feature vectors. The ground truth vector identification module 600 may further select multiple representative feature vectors from each cluster of the convex optimized clusters 608 and creates a set of best representative vectors for labeling.

As one may appreciate, the ground truth vector identification process described herein can be applied for selecting feature vectors for a variety of types of machine-learning models. A machine learning model training system can associate a label received from oracle identification for each feature vector of the set of best representative vectors and create a set of labeled feature vectors. The machine learning model training system may then use the set of labeled feature vectors to train a machine learning model.

Figure 7:
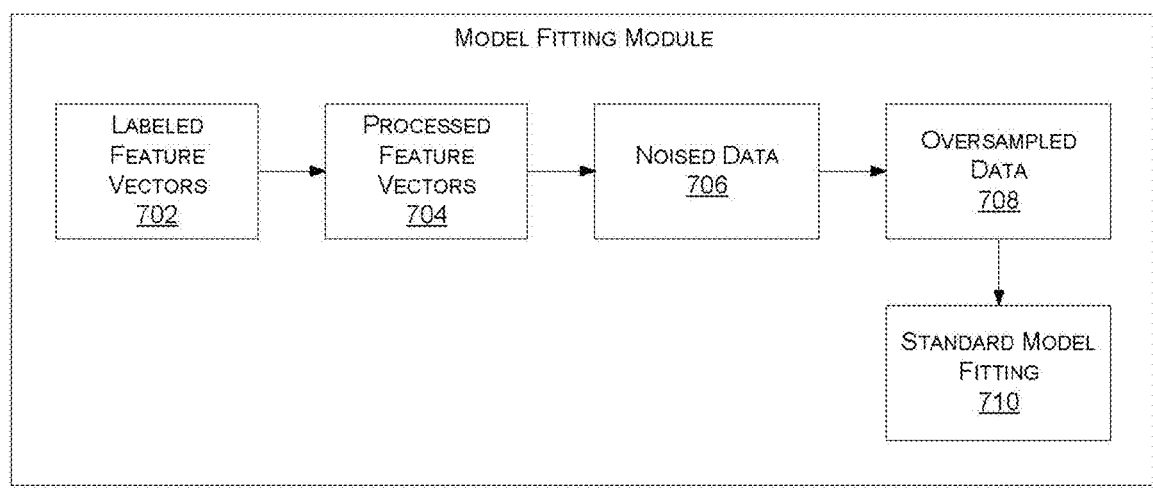
FIG. 7 is a block diagram illustrating a model fitting process in accordance with an embodiment of the present disclosure.

FIG. 7 is a block diagram illustrating a model fitting process performed by a model fitting module 700 in accordance with an embodiment of the present disclosure. In an embodiment, a machine learning model training system after training a machine learning model further performs model fitting based on a received set of labeled feature vectors 702 to improve the performance of the machine learning model. For example, the machine learning model training system may add normally distributed noise 706 to a set of processed feature vectors 704 derived from the labeled feature vectors 702 to improve generalizability and may perform synthetic oversampling to reduce the effect of class imbalance. In an embodiment, the model fitting module 700 of a machine learning model training system may receive labeled feature vectors 702, derive the processed feature vectors 704 after cleaning, add noise data 706, and obtain oversampled data 708 after performing synthetic oversampling. The model fitting module 700 may perform a standard model fitting 710 on the oversampled data 708. The model fitting process, as described above, addresses various aspects of the class imbalance problem faced by many traditional machine learning models and also improves generalizability.

Figure 8:
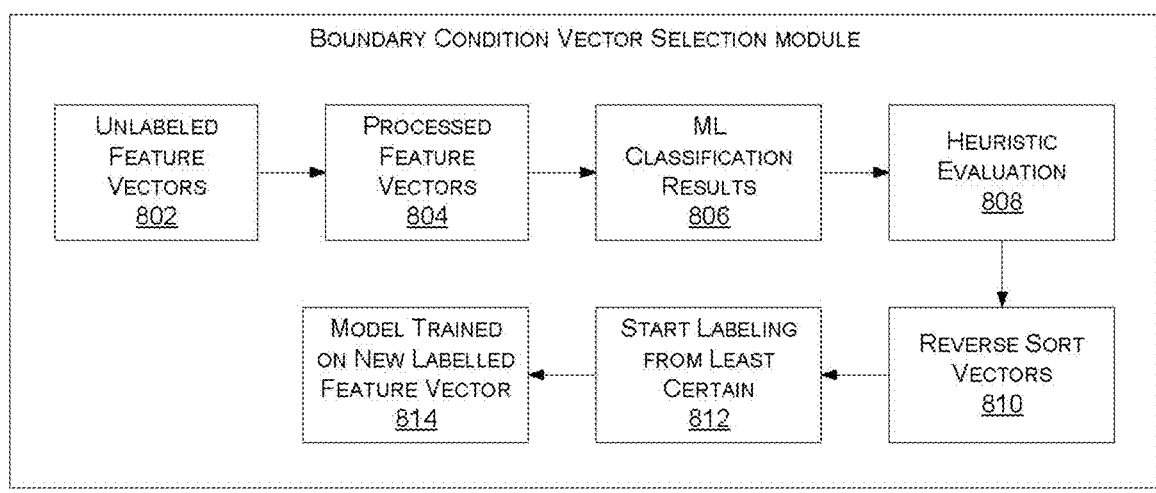
FIG. 8 is a block diagram illustrating a vector selection process in accordance with an embodiment of the present disclosure.

FIG. 8 is a block diagram illustrating a vector selection process performed by a boundary condition vector selection module 800 in accordance with an embodiment of the present disclosure. In an embodiment, a machine learning model training system after initial training of a machine learning model can further select one or more boundary condition feature vectors for labeling to improve the performance of the machine learning model. A machine learning model may classify certain feature vectors incorrectly. These feature vectors likely lie on decision boundary conditions. A machine learning training system may include the boundary condition vector selection module 800 to identify such boundary condition feature vectors for labeling. The boundary condition vector selection module 800 receives a set of unlabeled feature vectors 802, classifies using a machine learning model (as shown at block 806) processed feature vectors 804, calculates a prediction skepticism score by heuristic evaluation 808 for each feature vector of the set of unlabeled feature vectors when classified using the machine learning model, reverse sorts the set of unlabeled feature vectors (as shown at block 810) based on their respective prediction skepticism scores, and selects one or more boundary condition vectors according to the respective prediction skepticism for labeling. For example, a boundary condition vector having the highest degree of skepticism (the least certainty) may be selected for labeling from the reverse sorted list of the set of feature vectors. The machine learning training system may start labeling from least certain 812 feature vectors. In an embodiment, the set of unlabeled feature vectors 802 includes features that have not been labeled through any specific means, such as oracle identification or inductive learning. The one or more boundary condition feature vectors may be sent for oracle identification at 812. Finally, the machine-learning model may be retrained based on the newly labelled feature vector at 814.

Figure 9:
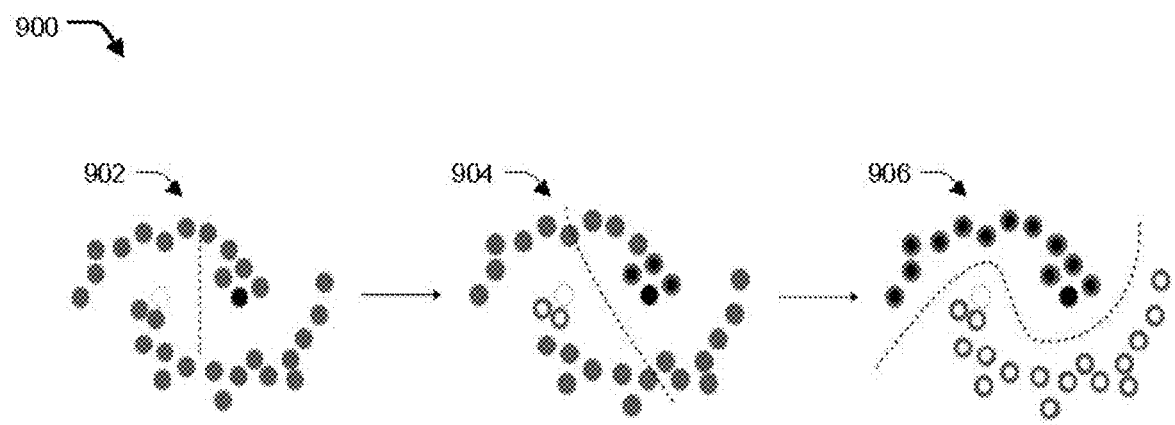
FIG. 9 illustrates improvement of a machine learning model with inductive learning in accordance with an embodiment of the present disclosure.

FIG. 9 illustrates improvement of a machine learning model 900 with inductive learning in accordance with an embodiment of the present disclosure. Some machine learning models perform prediction or classification of feature vectors based on training received on a small number of labeled feature vectors. In various embodiments described herein, an inductive learning process is adopted to further improve the performance of such machine learning models. FIG. 9 shows how clusters are defined, and model performance is improved as new data points are inductively learned from 902 to 904 to 906. As more and more data points are inductively labeled, cluster boundaries start becoming more clear and provide better clusters that are distinguishable with almost no boundary conditions.

Figure 10:
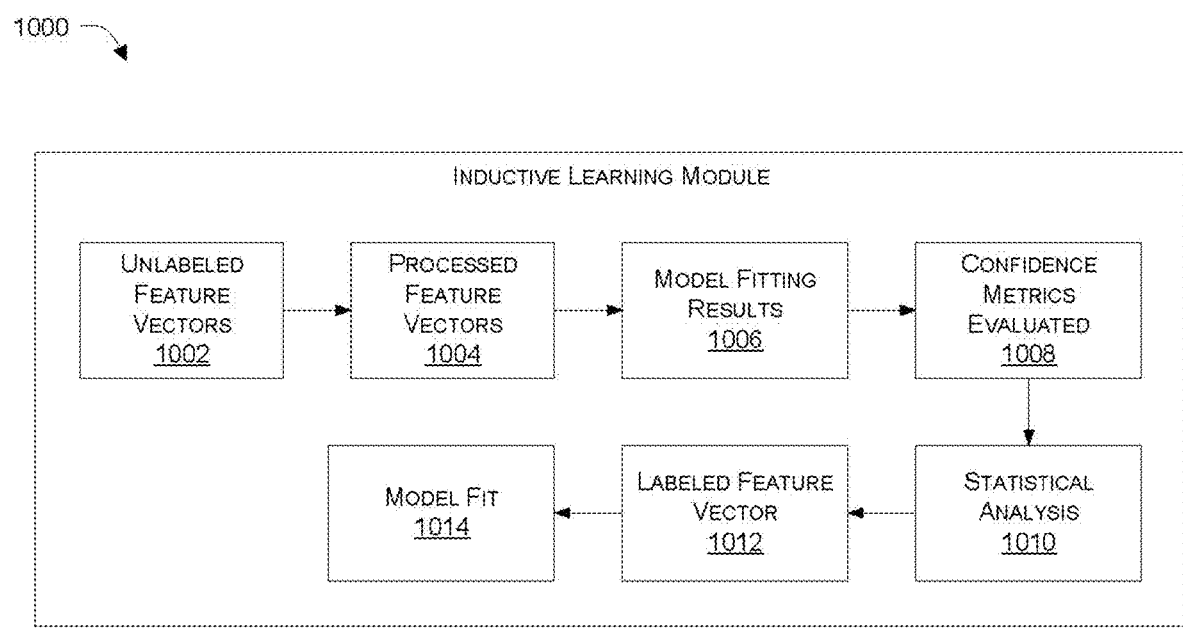
FIG. 10 is a block diagram illustrating an inductive learning process in accordance with an embodiment of the present disclosure.

FIG. 10 is a block diagram illustrating an inductive learning process performed by an inductive learning module 1000 in accordance with an embodiment of the present disclosure. In an embodiment, a machine learning model training system may use the inductive learning module 1000 to label un-labeled feature vectors that were not labeled through oracle identification. The inductive learning module receives un-labeled feature vectors 1002, derives processed feature vectors 1004, and obtains model fitting results 1006. In the context of the present example, the model-fitting results 1006 are unlabeled feature vectors classified using a machine learning model. The inductive learning module 1000 performs confidence metrics evaluation 1008 to generate a confidence score with which the machine learning model is able to classify the unlabeled feature vector. The inductive learning model further performs statistical analysis 1010 to determine a statistically matching cluster of labeled feature vectors to which the un-labeled feature vector is closest based on the Mahalanobis distance. A cluster of labeled feature vectors for which the Mahalanobis distance is the smallest is more statistically likely the cluster to which the unlabeled feature vector will belong. The module determines whether the model classified cluster and the statistically matching cluster are the same, and labels the un-labeled feature vector based on the label associated with the model classified cluster if the model classified cluster and statistically matching cluster are the same. The module feeds the labeled feature vector 1012 for performing model fitting 1014.

In an embodiment, where the machine learning model classifies the unlabeled feature vector with a very high confidence score, the unlabeled feature vector may be discarded. In a case where the confidence score with which the machine learning model is able to classify an unlabeled feature vector is less than a threshold, the inductive learning module further performs statistical analysis 1010 to identify a statistically matching cluster. If the machine-classified cluster and the statistically matching cluster have low correlation, then again, the unlabeled feature vector may be discarded. When the machine-classified cluster and the statistically identified cluster are identical, the unlabeled feature vector is labeled. A machine learning model training system employing the inductive learning module 1000 may iteratively learn unlabeled feature vectors. In an embodiment in which the machine-classified cluster and the statistically matching cluster have low correlation, the inductive learning module determines whether the machine learning model is able to classify the unlabeled feature vector with a relatively high confidence score, but the statistical likelihood of the unlabeled feature vector falling under the identified cluster is low. The inductive learning module 1000 may request a label through oracle identification when the machine learning model is able to classify the unlabeled feature vector with a relatively high confidence score, but the statistical likelihood of the unlabeled feature vector falling under the identified cluster is low.

Figure 11:
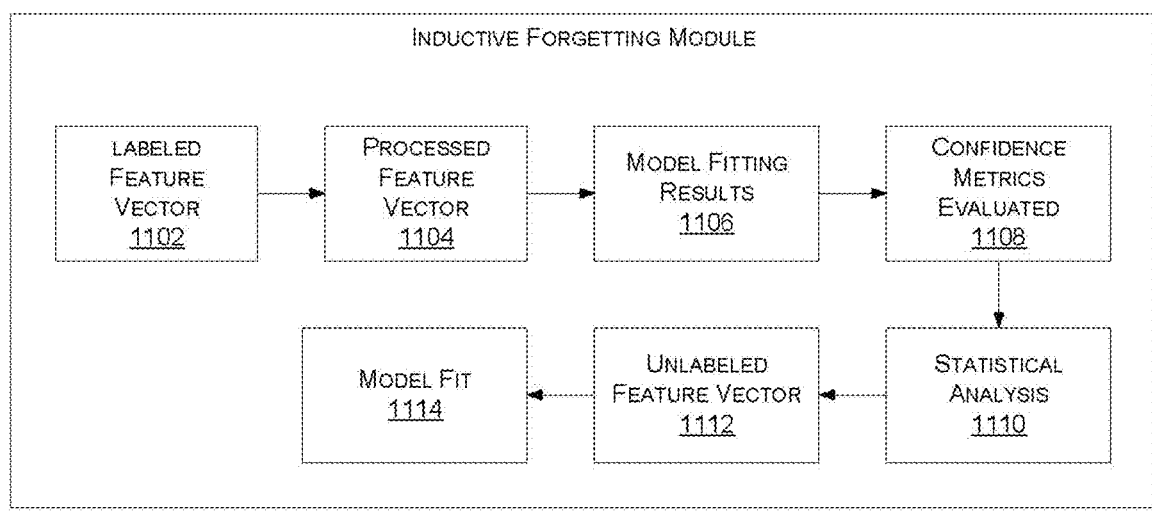
FIG. 11 is a block diagram illustrating an inductive forgetting process in accordance with an embodiment of the present disclosure.

FIG. 11 is a block diagram illustrating an inductive forgetting process performed by an inductive forgetting module 1100 in accordance with an embodiment of the present disclosure. A machine learning model training system may wrongly label a feature vector through inductive learning. In an embodiment, a machine learning model training system may include the inductive forgetting module 1100 to identify such wrongly labeled feature vectors and un-label those feature vectors. In the context of the present example, the inductive forgetting module 1100 picks a labeled feature vector 1102 from a set of labeled feature vectors that have been previously labeled by inductive learning, derives a processed feature vector 1104 after cleaning the labeled feature vector, and gets the model fitting results 1106. The model-fitting results 1006 are the labeled feature vector classifications using a machine learning model. The inductive forgetting module 1100 may then perform confidence metrics evaluation 1108. In an embodiment, when the machine learning model can classify the labeled feature vector with a very high confidence score, then the labeled feature vector will be left labeled as it is. In a scenario in which the confidence score with which the machine learning model is able to classify a labeled feature vector is less than a threshold or when statistical analysis 1110 reveals a statistically matching cluster of labeled feature vectors to which the feature vector is closest is not the same as the model classified cluster, the inductive forgetting module 1100 may mark the associated vector to be forgotten by the model. In this manner, the inductive forgetting module 1100 identifies a feature vector for un-labeling that may have been wrongly classified so as to rectify any mistakes made during inductive learning. The module may then feed the un-labeled feature vector 1112 for performing model fitting 1114.

The machine-learning model training system (e.g., machine-learning model training system 102, 210, and 302), the various modules associated with the machine-learning model training system described herein, and the processing described below with reference to the flow diagrams of FIGS. 12-16 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 17 below.

Figure 12:
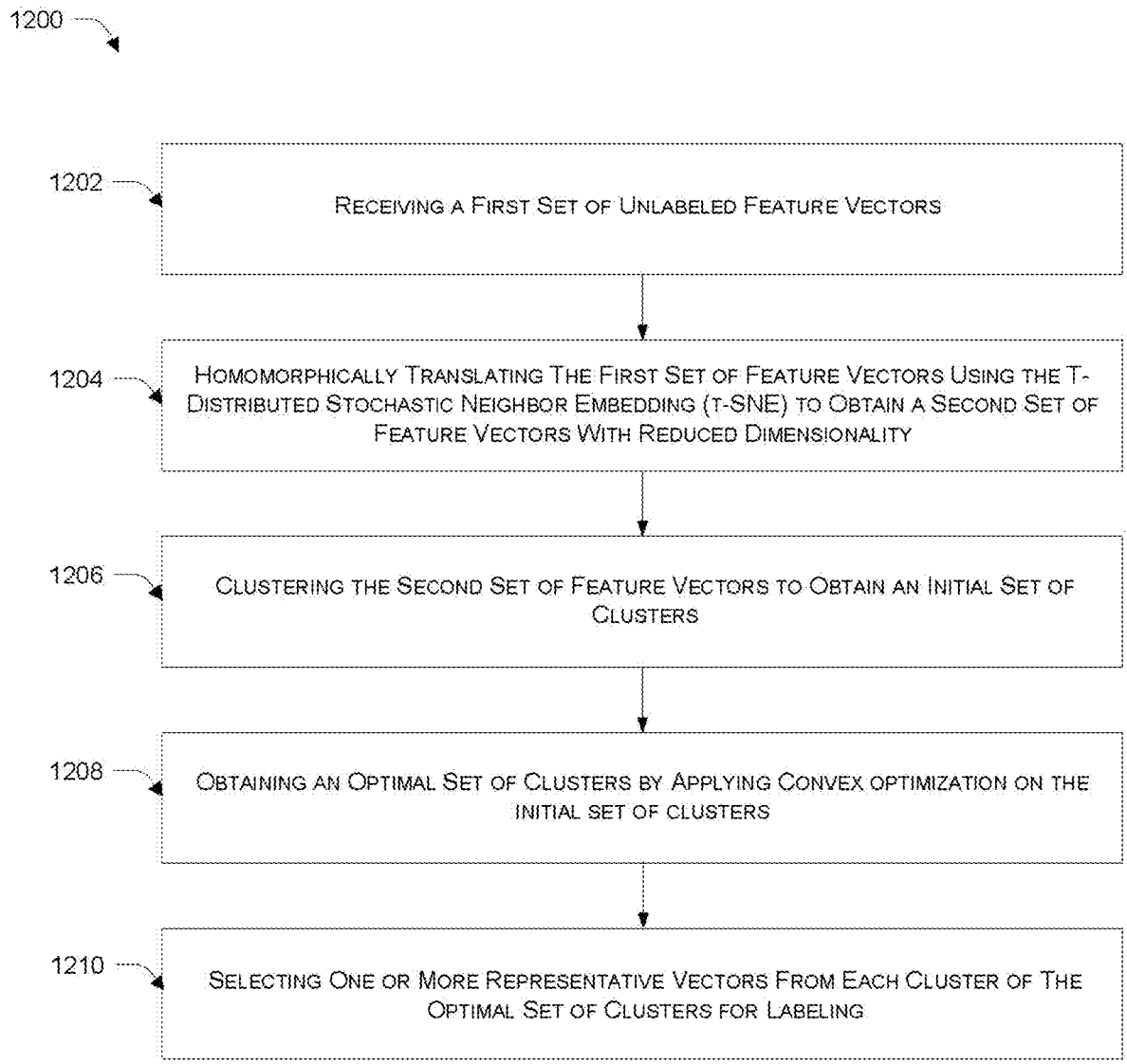
FIG. 12 is a flow diagram illustrating ground truth vector identification processing in accordance with an embodiment of the present disclosure.

FIG. 12 is a flow diagram illustrating ground truth vector identification processing 1200 in accordance with an embodiment of the present disclosure. In the context of the present example, the process starts at block 1202 in which training data in the form of a first set of un-labeled feature vectors are received by a machine learning model training system (e.g., machine learning model training system 102, 210, or 302).

At block 1204 the first set of feature vectors are homomorphically translated to obtain a second set of feature vectors (the homomorphic-translated set) with reduced dimensionality. According to one embodiment, the homomorphic translation is operable to reduce dimensionality as well as encourage clustering based upon both linear as well as non-linear tendencies. In this manner, the runtime performance of the clustering analysis may be improved by drastically reducing the number of dimensions to be handled and more accurate clusters may be provided. In one embodiment, the homomorphic translation involves application of the t-SNE algorithm to the first set of feature vectors.

At block 1206, the second set of feature vectors are clustered to obtain an initial set of clusters. In one embodiment, the clustering involves performing a centroid-based clustering based on constructed probability distributions of Cartesian distances between different vectors within the homomorphic-translated set.

At block 1208, an optimal set of clusters is obtained by applying a convex optimization process to the initial set of clusters. In one embodiment, the convex optimization process involves the use of Function-1 described above.

At block 1210, one or more representative vectors from each cluster of the optimal set of clusters is selected for labeling. This process may be referred to as seed identification or ground truth vector identification. According to one embodiment, the representative vector of a cluster is the feature vector closest to the center of the cluster. These ground truth vectors may then be sent for labeling via oracle identification.

Figure 13:
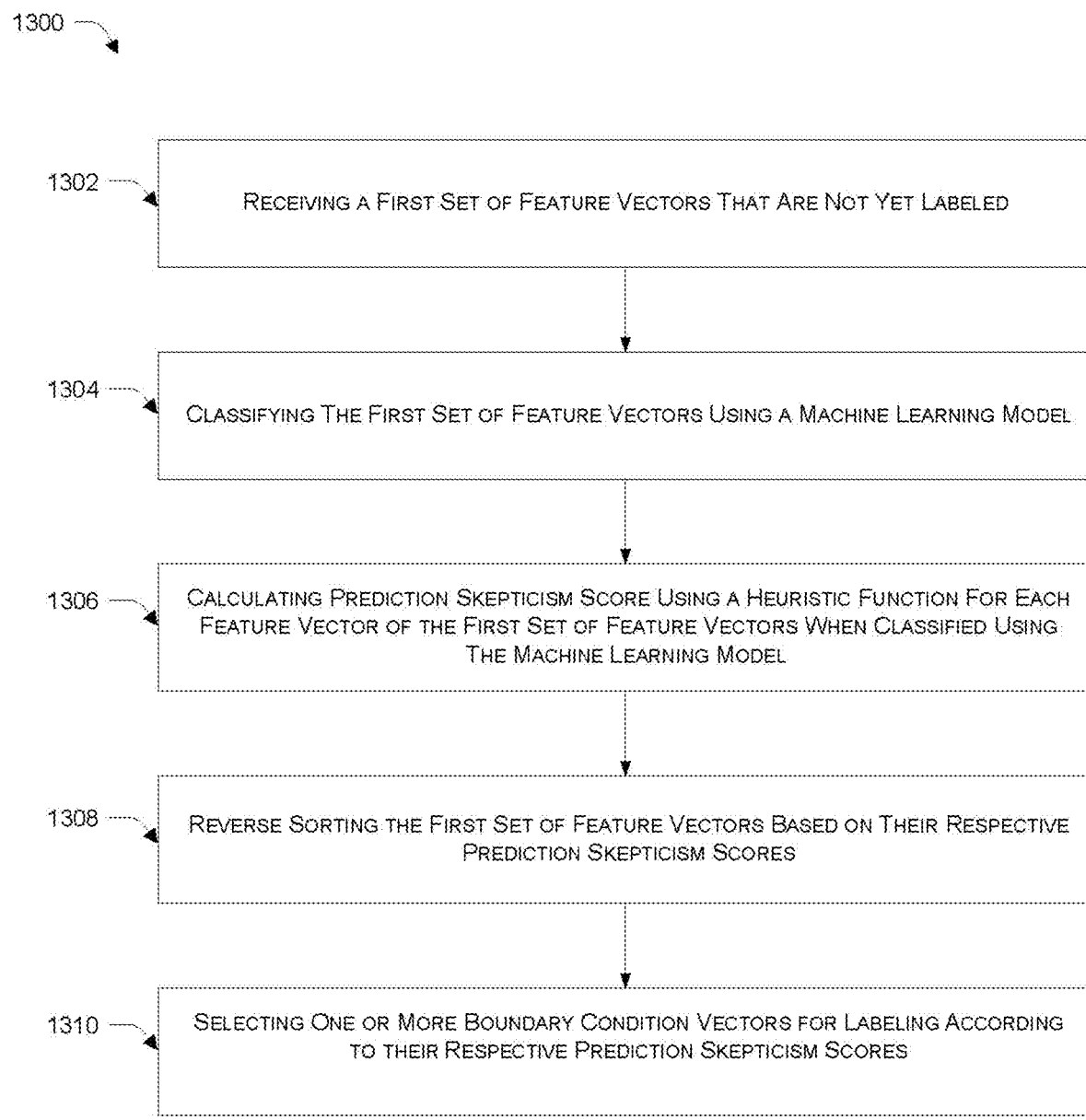
FIG. 13 is a flow diagram illustrating vector selection processing in accordance with an embodiment of the present disclosure.

FIG. 13 is a flow diagram illustrating vector selection processing 1300 in accordance with an embodiment of the present disclosure. A machine learning model may not be able to accurately classify certain feature vectors lying in a particular region referred to as a decision boundary of a machine-learning model. In the context of the present example, after performing initial training of a machine-learning model, a vector selection module (e.g., vector selection module 218 or boundary condition vector selection module 110) of a machine learning model training system (e.g., machine-learning model training system 102, 210, or 302) may select one or more boundary condition feature vectors for labeling to improve the performance of the machine learning model.

At block 1302, a first set of unlabeled feature vectors are received by a machine learning model training system (e.g., machine learning model training system 102, 210, or 302).

At block 1304, the first set of feature vectors are classified using a machine learning model (e.g., machine learning model 304).

At block 1306, a prediction skepticism score is calculated for the classification of each feature vector of the first set of feature vectors by the machine-learning model. According to one embodiment, a heuristic function (e.g., Function-2) is used to calculate the prediction skepticism score based on how uncertain the model is about the prediction. In one embodiment, the heuristic function attempts to both (i) maximize Shannon's entropy of the probability distribution; and (ii) minimize the maximum probability margin. As such, rather than looking solely at how uncertain the model is about the prediction, in one embodiment, the scoring also takes into consideration the confidence of predicting a class compared to the other confidence values.

At block 1308, the first set of feature vectors are reverse sorted based on their respective prediction skepticism scores to order them from highest to lowest degree of prediction skepticism.

At block 1310, one or more boundary condition vectors are selected based on their respective prediction skepticism scores. In one embodiment, a boundary condition vector, representing the feature vector having the highest degree of prediction skepticism, is pulled from the top of the reverse sorted list. The selected one or more boundary condition vectors may then be sent for labeling by an oracle.

Figure 14:
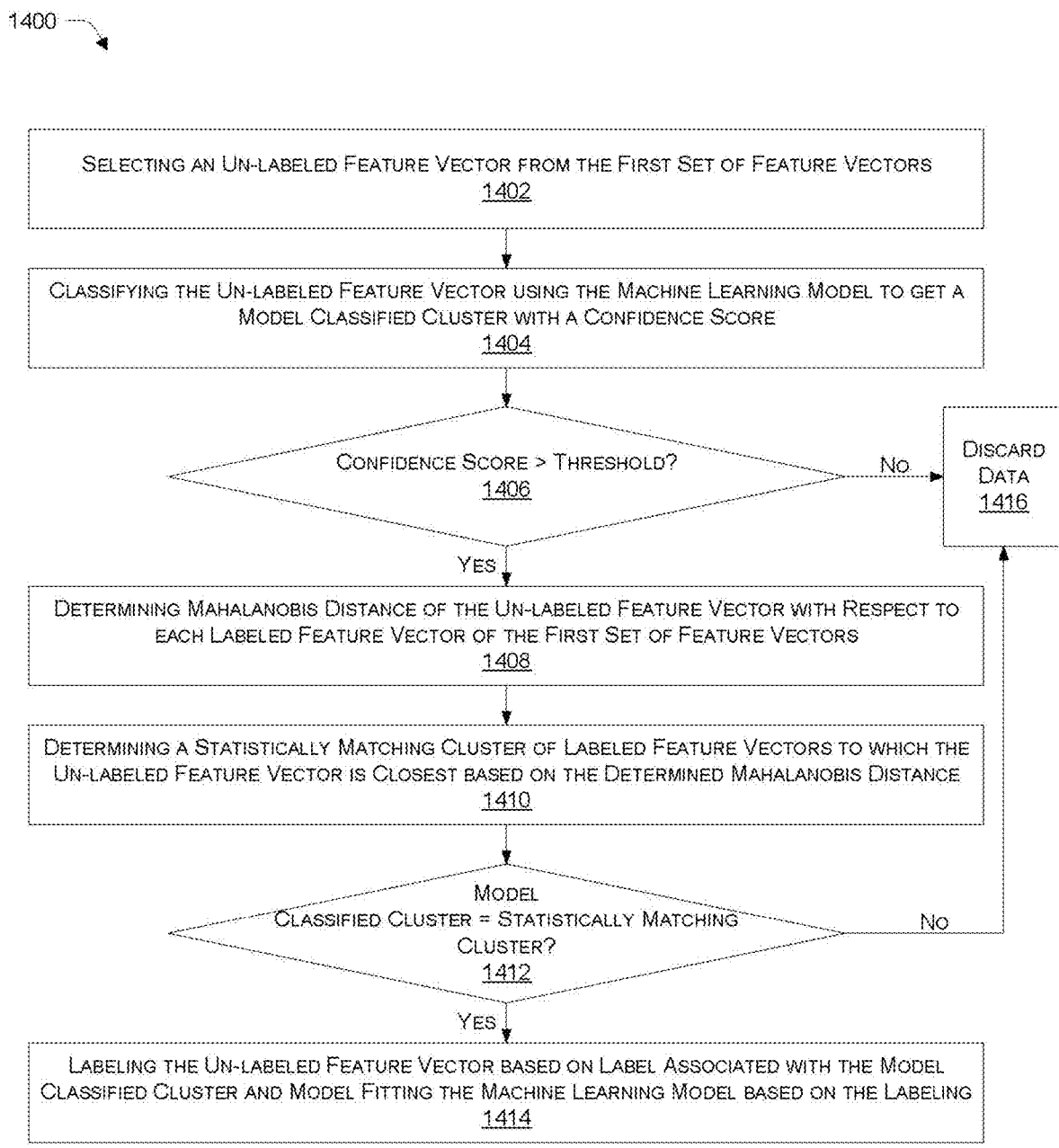
FIG. 14 is a flow diagram illustrating inductive learning processing in accordance with an embodiment of the present disclosure.

FIG. 14 is a flow diagram illustrating inductive learning processing 1400 in accordance with an embodiment of the present disclosure. A machine learning model training system may use an inductive learning module (e.g., inductive learning module 506 or 1000) to label unlabeled feature vectors that were not labeled through oracle identification.

At block 1402, an unlabeled feature vector is selected from a first set of unlabeled feature vectors.

At block 1404, the selected, un-labeled feature vector is classified using a machine learning model to obtain a model classified cluster with a corresponding confidence score.

At decision block 1406, a determination is made regarding whether the confidence score is greater than a threshold. When the confidence score exceeds the threshold, processing continues with block 1408; otherwise, the data is discarded at block 1416.

At block 1408, a distance metric is determined for the un-labeled feature vector with respect to each labeled feature vector of the first set of feature vectors. In one embodiment, the distance metric is the Mahalanobis distance.

At block 1410, a statistically matching cluster of labeled feature vectors to which the un-labeled feature vector is closest is determined based on the distance metric determined at block 1408.

At decision block 1412, a determination is made regarding whether the model classified cluster and the statistically matching cluster are the same. If so, processing continues with block 1414; otherwise the data is discarded at block 1416.

At block 1414, the un-labeled feature vector is labeled based on the label associated with the model classified cluster. As shown in FIG. 5 and FIG. 10, after labeling of the new feature vector, model fitting may be performed based on the modification.

Figure 15:
FIG. 15 is a flow diagram illustrating inductive forgetting processing in accordance with an embodiment of the present disclosure.

FIG. 15 is a flow diagram illustrating an inductive forgetting processing performed by an inductive forgetting module 1500 (e.g., inductive forgetting module 114, 224, or 1100) in accordance with an embodiment of the present disclosure. In the context of the present example, inductive forgetting is performed to forget (un-label) a feature vector that has been misclassified by the inductive learning process. As noted above, in one embodiment, the inductive learning is slow and deterministic when learning new vectors, while the inductive forgetting is hyper aggressive when it comes to forgetting old ones. As those skilled in the art will appreciate, this combination ensures few mistakes are made when learning, and any mistakes that are made are quickly rectified.

At block 1502, a feature vector from a set of feature vectors that has been labeled as a result of inductive learning is selected.

At block 1504, the selected feature vector is classified by the machine learning model to obtain a model classified cluster with a corresponding confidence score.

At block 1506, a determination is made regarding whether the confidence score is lower than a base threshold.

At block 1508, when the confidence score is lower than the base threshold, a distance metric (e.g., a Mahalanobis distance) of the feature vector is determined with respect to other labeled feature vectors of the first set of feature vectors.

At block 1510, a statistically matching cluster of labeled feature vectors to which the feature vector is closest is determined based on the distance metric.

At block 1512, a determination is made regarding whether the model classified cluster and the statistically matching cluster are the same.

At block 1514, when the model classified cluster and the statistically matching cluster are not the same or when the model confidence is lower than the base threshold, the feature vector is un-labeled (forgotten). As shown in FIG. 5 and FIG. 11, after performing inductive forgetting processing, model fitting may be performed based on the modification.

Figure 16:
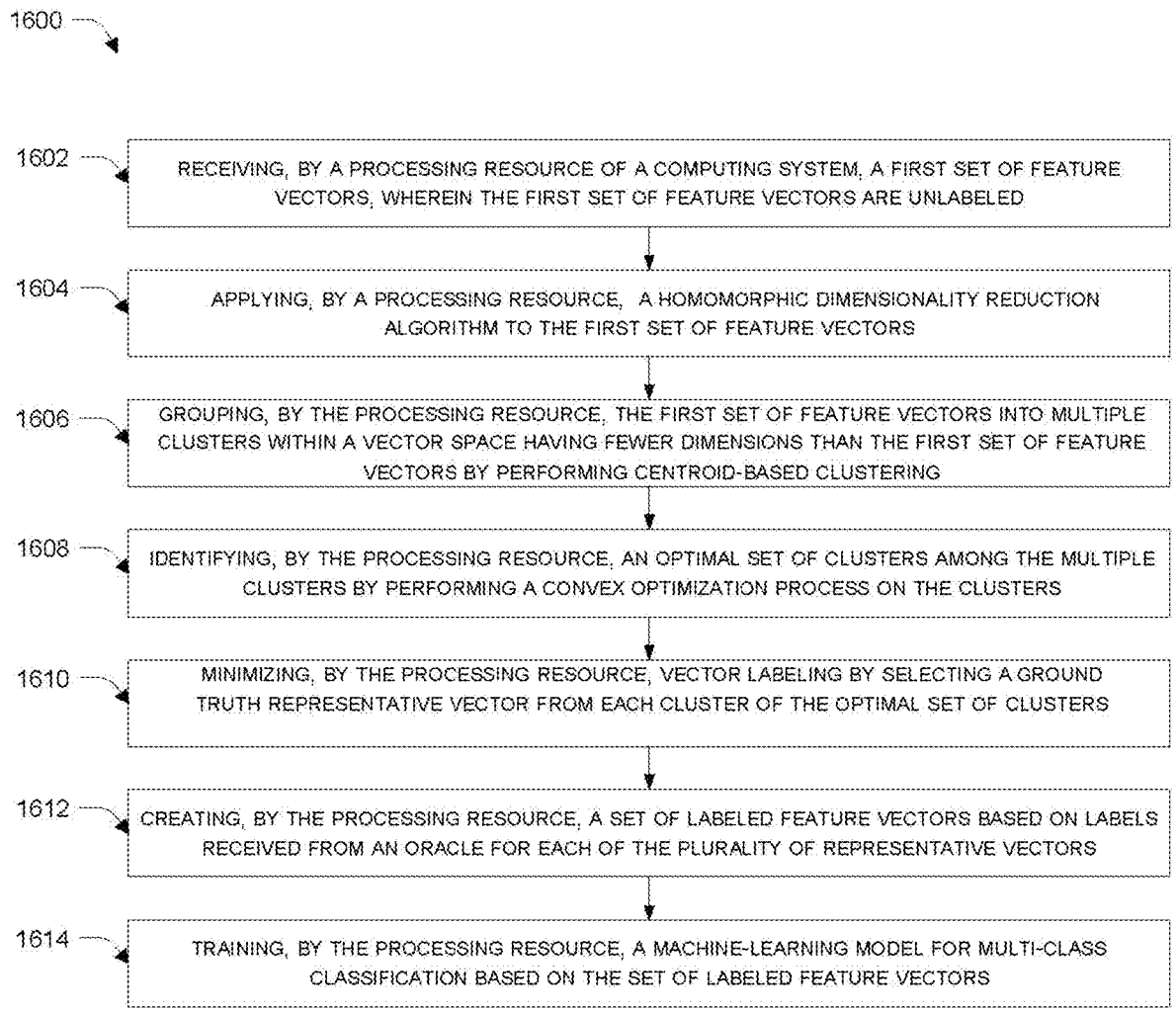
FIG. 16 is a flow diagram illustrating machine-learning model training processing in accordance with an embodiment of the present disclosure.

FIG. 16 is a flow diagram illustrating machine-learning model training processing 1600 in accordance with an embodiment of the present disclosure. At block 1602, a processing resource of a computing system (e.g., the machine-learning model training system) receives training data in the form of a first set of un-labeled feature vectors.

At block 1604, a homomorphic transformation is applied to the first set of feature vectors. According to one embodiment, the homomorphic transformation involves the use of the t-SNE algorithm to obtain a second set of feature vectors with reduced dimensionality.

At block 1606, the first set of feature vectors are grouped into multiple clusters within a vector space having fewer dimensions than the first set of feature vectors by performing centroid-based clustering.

At block 1608, an optimal set of clusters is identified from among the multiple clusters by performing a convex optimization process on the clusters. In this manner, optimal clustering may be fully automated and an expert is not required to identify the optimal clustering by hand.

At block 1610, vector labeling is minimized by selecting a ground truth representative vector from each cluster of the optimal set of clusters. In this manner, model training can be performed by a layperson as the best possible seeds for classification are automatically selected without the potential ambiguity resulting from the elbow method in which an operator uses his/her judgement to evaluate a graph depicting the distances of points to its particular cluster to identify an "elbow" in the graph.

At block 1612, a set of labeled feature vectors are created based on labels received from an oracle for each of the ground truth vectors selected at block 1610.

At block 1614, a machine-learning model is trained for multi-class classification based on the set of labeled feature vectors.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 17:
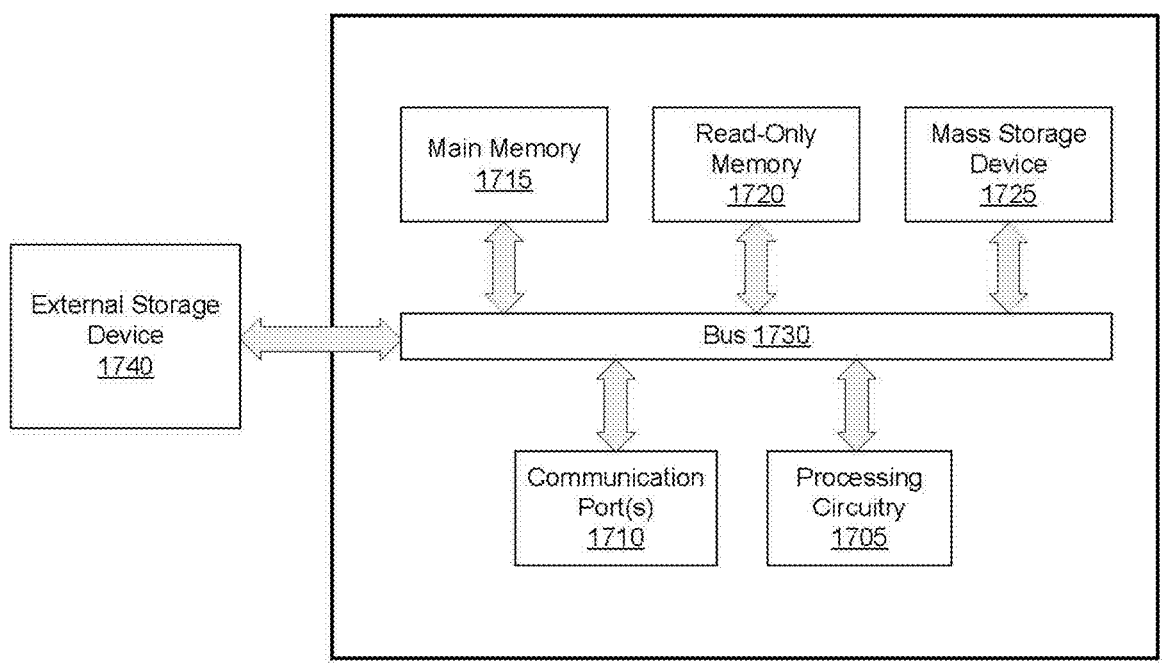
FIG. 17 illustrates an exemplary computer system in which or with which embodiments of the present invention may be utilized.

FIG. 17 illustrates an exemplary computer system in which or with which embodiments of the present invention may be utilized. As shown in FIG. 17, a computer system includes an external storage device 1740, a bus 1730, a main memory 1715, a read-only memory 1720, a mass storage device 1725, a communication port 1710, and one or more processing resources (e.g., processing circuitry 1705). Computer system 1700 may represent some portion of a machine-learning model training system (e.g., machine-learning model training system 102, 210, or 302) on which the machine learning model is trained or a computer system or network device (e.g., network device 402) on which the machine learning model is deployed.

Those skilled in the art will appreciate that computer system 1700 may include more than one processor and communication ports 1710. Examples of processing circuitry 1705 include, but are not limited to, an Intel® Itanium® or Itanium 2 processor(s), or AMD® Opteron® or Athlon MP® processor(s), Motorola® lines of processors, FortiSOC™ system on chip processors or other future processors. Processing circuitry 1705 may include various modules associated with embodiments of the present invention.

Communication port 1710 can be any of an RS-232 port for use with a modem-based dialup connection, a 10/100 Ethernet port, a Gigabit or 10 Gigabit port using copper or fiber, a serial port, a parallel port, or other existing or future ports. Communication port 1710 may be chosen depending on a network, such as a Local Area Network (LAN), Wide Area Network (WAN), or any network to which the computer system connects.

Memory 1715 can be Random Access Memory (RAM), or any other dynamic storage device commonly known in the art. Read-Only Memory 1720 can be any static storage device(s) e.g., but not limited to, a Programmable Read-Only Memory (PROM) chips for storing static information e.g. start-up or BIOS instructions for processing circuitry 1705.

Mass storage 1725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1730 communicatively couples processing circuitry 1705 with the other memory, storage, and communication blocks. Bus 1730 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing circuitry 1705 to a software system.

Optionally, operator and administrative interfaces, e.g. a display, keyboard, and a cursor control device, may also be coupled to bus 1730 to support direct operator interaction with the computer system. Other operator and administrative interfaces can be provided through network connections connected through communication port 1710. An external storage device 1740 can be any kind of external hard-drives, floppy drives, IOMEGA® Zip Drives, Compact Disc—Read-Only Memory (CD-ROM), Compact Disc—Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices can exchange data with each other over the network, possibly via one or more intermediary devices.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   receiving, by a processing resource of a computing system, a first set of feature vectors, wherein the first set of feature vectors are un-labeled;
   grouping, by the processing resource, the first set of feature vectors into a plurality of clusters within a vector space having fewer dimensions than the first set of feature vectors by applying a homomorphic dimensionality reduction algorithm to the first set of feature vectors and performing centroid-based clustering;
   identifying, by the processing resource, an optimal set of clusters among the plurality of clusters by performing a convex optimization process on the plurality of clusters;
   minimizing, by the processing resource, vector labeling by selecting a plurality of ground truth representative vectors including a representative vector from each cluster of the optimal set of clusters;
   creating, by the processing resource, a set of labeled feature vectors based on labels received from an oracle for each of the plurality of representative vectors;
   training, by the processing resource, a machine-learning model for multiclass classification based on the set of labeled feature vectors; and
   training the machine-learning model with inductive learning, wherein the inductive learning comprises:
      selecting an unlabeled feature vector from the first set of feature vectors;
      classifying the un-labeled feature vector using the machine learning model to get a model classified cluster with a confidence score;
      determining whether the confidence score is greater than a threshold; and
      when said determining is affirmative:
         determining a Mahalanobis distance of the un-labeled feature vector with respect to each labeled feature vector of the first set of feature vectors;
         determining a statistically matching cluster of labeled feature vectors to which the un-labeled feature vector is closest based on the determined Mahalanobis distance;
         determining whether the model classified cluster and the statistically matching cluster are the same; and
         when the model classified cluster and the statistically matching cluster are determined to be the same:
            labeling the un-labeled feature vector based on the label associated with the model classified cluster; and
            model fitting the machine learning model based on the labeling.

2. The method of claim 1, wherein the homomorphic dimensionality reduction algorithm comprises T-Distributed Stochastic Neighbor Embedding (t-SNE).

3. The method of claim 1, wherein the centroid-based clustering is based on constructed probability distributions of Cartesian distances between different vectors within the homomorphically translated set.

4. The method of claim 1, further comprising:
   calculating, by the processing resource, a prediction skepticism score for each feature vector of the first set of feature vectors when classified using the machine-learning model based on a skepticism heuristic function; and
   selecting, by the processing resource, a boundary condition vector for labeling from the first set of feature vectors, wherein the prediction skepticism score of the boundary condition vector has a highest degree of skepticism.

5. The method of claim 4, further comprising:
   associating, by the processing resource, a label received from the oracle with the boundary condition vector; and
   retraining, by the processing resource, the machine-learning model.

6. The method of claim 1, wherein the plurality representative vectors are selected based on a distance from the center of their respective clusters of the optimal set of clusters.

7. The method of claim 1, further comprising inductively forgetting a feature vector; wherein said inductively forgetting comprises:
- selecting a labeled feature vector from a set of feature vectors that have been labeled through inductive learning;
- classifying the labeled feature vector using the machine learning model to get a model classified cluster with a confidence score;
- determining whether the confidence score is lower than a base threshold; and
- when said determining is affirmative:
  - determining a Mahalanobis distance of the labeled feature vector with respect to other labeled feature vector of the first set of feature vectors;
  - determining a statistically matching cluster of labeled feature vectors to which the labeled feature vector is closest based on the determined Mahalanobis distance;
  - determining whether the model classified cluster and the statistically matching cluster are the same; and
  - when the model classified cluster and the statistically matching cluster are not the same:
    - un-labelling the labeled feature vector; and
    - model fitting the machine learning model based on the un-labeling.

8. A system comprising:
- a processing resource; and
- a non-transitory computer-readable medium, coupled to the processing resource, having stored therein instructions that when executed by the processing resource cause the processing resource to:
- receive a first set of feature vectors, wherein the first set of feature vectors are un-labeled;
- group the first set of feature vectors into a plurality of clusters within a vector space having fewer dimensions than the first set of feature vectors by applying a homomorphic dimensionality reduction algorithm to the first set of feature vectors and performing centroid-based clustering;
- identify an optimal set of clusters among the plurality of clusters by performing a convex optimization process on the plurality of clusters;
- minimize vector labeling by selecting a plurality of ground truth representative vectors including a representative vector from each cluster of the optimal set of clusters;
- create a set of labeled feature vectors based on labels received from an oracle for each of the plurality of representative vectors;
- train a machine-learning model for multiclass classification based on the set of labeled feature vectors; and
- train the machine-learning model with inductive learning, wherein the inductive learning comprises:
  - selecting an unlabeled feature vector from the first set of feature vectors;
  - classifying the un-labeled feature vector using the machine learning model to get a model classified cluster with a confidence score;
  - determining whether the confidence score is greater than a threshold; and
  - when said determining is affirmative:
    - determining a Mahalanobis distance of the un-labeled feature vector with respect to each labeled feature vector of the first set of feature vectors;
    - determining a statistically matching cluster of labeled feature vectors to which the un-labeled feature vector is closest based on the determined Mahalanobis distance;
    - determining whether the model classified cluster and the statistically matching cluster are the same; and
    - when the model classified cluster and the statistically matching cluster are determined to be the same:
      - labeling the un-labeled feature vector based on the label associated with the model classified cluster; and
      - model fitting the machine learning model based on the labeling.

9. The system of claim 8, wherein the homomorphic dimensionality reduction algorithm comprises T-Distributed Stochastic Neighbor Embedding (t-SNE).

10. The system of claim 8, wherein the centroid-based clustering is based on constructed probability distributions of Cartesian distances between different vectors within the homomorphically translated set.

11. The system of claim 8, wherein the instructions further cause the processing resource to:
- calculate a prediction skepticism score for each feature vector of the first set of feature vectors when classified using the machine-learning model based on a skepticism heuristic function; and
- select a boundary condition vector for labeling from the first set of feature vectors, wherein the prediction skepticism score of the boundary condition vector has a highest degree of skepticism.

12. The system of claim 11, wherein the instructions further cause the processing resource to:
- associate a label received from the oracle with the boundary condition vector; and
- retrain the machine-learning model.

13. The system of claim 8, wherein the plurality representative vectors are selected based on a distance from the center of their respective clusters of the optimal set of clusters.

14. The system of claim 8, wherein the instructions further cause the processing resource to inductively forget a feature vector, wherein inductively forgetting comprises:
- selecting a labeled feature vector from a set of feature vectors that have been labeled through inductive learning;
- classifying the labeled feature vector using the machine learning model to get a model classified cluster with a confidence score;
- determining whether the confidence score is lower than a base threshold; and
- when said determining is affirmative:
  - determining a Mahalanobis distance of the labeled feature vector with respect to other labeled feature vector of the first set of feature vectors;
  - determining a statistically matching cluster of labeled feature vectors to which the labeled feature vector is closest based on the determined Mahalanobis distance;
  - determining whether the model classified cluster and the statistically matching cluster are the same; and
  - when the model classified cluster and the statistically matching cluster are not the same:
    - un-labelling the labeled feature vector; and
    - model fitting the machine learning model based on the un-labeling.

15. The system of claim 8, wherein the first set of feature vectors are representative of a plurality of types of Internet of Things (IoT) devices and the machine learning model is trained for classifying IoT devices, and wherein the machine learning model is deployed on a network security device.

16. A non-transitory machine readable medium storing instructions that when executed by a processing resource of a computer system cause the processing resource to:
- receive a first set of feature vectors, wherein the first set of feature vectors are un-labeled;
- group the first set of feature vectors into a plurality of clusters within a vector space having fewer dimensions than the first set of feature vectors by applying a homomorphic dimensionality reduction algorithm to the first set of feature vectors and performing centroid-based clustering;
- identify an optimal set of clusters among the plurality of clusters by performing a convex optimization process on the plurality of clusters;
- minimize vector labeling by selecting a plurality of ground truth representative vectors including a representative vector from each cluster of the optimal set of clusters;
- create a set of labeled feature vectors based on labels received from an oracle for each of the plurality of representative vectors;
- train a machine-learning model for multiclass classification based on the set of labeled feature vectors; and
- train the machine-learning model with inductive learning, wherein the inductive learning comprises:
  - selecting an unlabeled feature vector from the first set of feature vectors;
  - classifying the un-labeled feature vector using the machine learning model to get a model classified cluster with a confidence score;
  - determining whether the confidence score is greater than a threshold; and
  - when said determining is affirmative:
    - determining a Mahalanobis distance of the un-labeled feature vector with respect to each labeled feature vector of the first set of feature vectors;
    - determining a statistically matching cluster of labeled feature vectors to which the un-labeled feature vector is closest based on the determined Mahalanobis distance;
    - determining whether the model classified cluster and the statistically matching cluster are the same; and
    - when the model classified cluster and the statistically matching cluster are determined to be the same:
      - labeling the un-labeled feature vector based on the label associated with the model classified cluster; and
      - model fitting the machine learning model based on the labeling.

17. The non-transitory machine readable medium of claim 16, wherein the homomorphic dimensionality reduction algorithm comprises T-Distributed Stochastic Neighbor Embedding (t-SNE).

18. The non-transitory machine readable medium of claim 16, wherein the centroid-based clustering is based on constructed probability distributions of Cartesian distances between different vectors within the homomorphically translated set.

* * * * *